US012640489B2

(12) United States Patent
Singh et al.

(10) Patent No.: US 12,640,489 B2
(45) Date of Patent: May 26, 2026

(54) METASURFACE INTEGRATED NON-TERRESTRIAL NETWORK TRANSCODER WITH ADAPTIVE SLICING FOR DYNAMIC ALLOCATION OF MESH RESOURCES

(71) Applicant: Dell Products L.P., Round Rock, TX (US)

(72) Inventors: Tejinder Singh, Manotick (CA); Navjot Kaur Khaira, Manotick (CA); Michael J. Healy, Scituate, MA (US)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 18/902,100

(22) Filed: Sep. 30, 2024

(65) Prior Publication Data
US 2026/0094971 A1     Apr. 2, 2026

(51) Int. Cl.
| | |
|---|---|
| *H01Q 15/00* | (2006.01) |
| *H01Q 1/28* | (2006.01) |
| *H04B 7/04* | (2017.01) |

(52) U.S. Cl.
CPC ......... *H01Q 15/0086* (2013.01); *H01Q 1/288* (2013.01); *H04B 7/04013* (2023.05)

(58) Field of Classification Search
CPC . H01Q 15/0086; H01Q 1/288; H04B 7/04013
See application file for complete search history.

(56) References Cited

U.S. PATENT DOCUMENTS

| | | | |
|---|---|---|---|
| 10,211,532 B2 * | 2/2019 | Foo ..................... | H01Q 21/061 |
| 10,770,790 B1 | 9/2020 | Mahanfar | |

(Continued)

FOREIGN PATENT DOCUMENTS

| | | |
|---|---|---|
| CN | 117768269 A | 3/2024 |

OTHER PUBLICATIONS qorvo.com, "CMD262 26-28 GHZ (Ka Band) GaN Power Amplifier", Rev-A, URL- https://www.qorvo.com/products/p/CMD262, Jun. 14, 2022, 1 page.

(Continued)

*Primary Examiner* — Seung H Lee
(74) *Attorney, Agent, or Firm* — Amin, Turocy & Watson, LLP

(57) ABSTRACT
The technology described herein is directed towards a transcoder with bypass capabilities that can be used to couple non-terrestrial network satellites to user equipment (UEs), including by decoding and reencoding data packets at the packet level for existing Satcom satellites. A metasurface redirects signals from the satellite to a satellite radio frequency (RF) interface of the transcoder, with the transcoder also coupled by a UE RF interface to a UE, such as a computing device or cellphone. Dynamically slicing (subdividing) a metasurface associated with a transcoder node facilitates using part of the metasurface for UE or satellite communications, and another part to facilitate a mesh network among transcoder nodes, which helps with data privacy. The slicing can be adaptively performed based on learning and artificial intelligence models implemented into the transcoder nodes as edge computing devices. The transcoder can convert Satcom signals to and from new radio signals.

20 Claims, 14 Drawing Sheets

(56) References Cited

U.S. PATENT DOCUMENTS

| | | | | |
|---|---|---|---|---|
| 10,931,004 | B2* | 2/2021 | Yoo | H04B 7/0413 |
| 11,329,375 | B1 | 5/2022 | West et al. | |
| 11,855,745 | B2 | 12/2023 | Schloemer | |
| 12,519,509 | B2* | 1/2026 | Zuo | H04B 7/04013 |
| 2016/0112117 | A1 | 4/2016 | Platzer et al. | |
| 2019/0334228 | A1 | 10/2019 | Haridas et al. | |
| 2021/0013619 | A1* | 1/2021 | Alkhateeb | H04B 7/04013 |
| 2022/0026524 | A1 | 1/2022 | Maruyama et al. | |
| 2022/0231411 | A1 | 7/2022 | Lin | |
| 2023/0101393 | A1 | 3/2023 | Dai et al. | |
| 2023/0142735 | A1 | 5/2023 | Raghavan et al. | |
| 2023/0188170 | A1 | 6/2023 | Dutta et al. | |
| 2023/0319507 | A1 | 10/2023 | Gummadi et al. | |
| 2024/0014862 | A1 | 1/2024 | Duan et al. | |
| 2024/0364019 | A1 | 10/2024 | Hussain | |
| 2024/0378930 | A1 | 11/2024 | Motos et al. | |
| 2024/0429969 | A1* | 12/2024 | Hong | H01Q 15/148 |
| 2025/0062529 | A1 | 2/2025 | Nathan et al. | |
| 2025/0125525 | A1 | 4/2025 | Rossanese et al. | |
| 2025/0175217 | A1* | 5/2025 | Albanese | H01Q 15/002 |
| 2025/0274165 | A1 | 8/2025 | Manolakos et al. | |
| 2026/0046613 | A1 | 2/2026 | Elshafie et al. | |

OTHER PUBLICATIONS

Ndjiongue et al., "Re-Configurable Intelligent Surface-Based VLC Receivers Using Tunable Liquid-Crystals: The Concept", Journal of Lightwave Technology, vol. 39, No. 10, May 15, 2021, pp. 3193-3200.

Long et al., "Active Reconfigurable Intelligent Surface Aided Wireless Communications", IEEE Transactions on Wireless Communications, vol. 20, No. 8, Aug. 2021, pp. 4962-4975.

Hu et al., "Design of a Novel 2-bit Wideband Beam-Scanning Reconfigurable Intelligent Surface", IEEE International Workshop on Electromagnetics: Applications and Student Innovation Competition, 2021, pp. 1-3.

Gros et al., "A Reconfigurable Intelligent Surface at mmWave Based on a Binary Phase Tunable Metasurface", IEEE Open Journal of the Communications Society, vol. 2, 2021, pp. 1055-1064.

Sievenpiper et al., "Two-dimensional Beam Steering Using an Electrically Tunable Impedance Surface", IEEE Transactions on Antennas and Propagation, vol. 51, No. 10, Oct. 2003, pp. 2713-2722.

Guclu et al., "Proof of Concept of a Dual-band Circularly-polarized Rf Mems Beam-switching Reflectarray", IEEE Transactions on Antennas and Propagation, vol. 60, No. 11, Nov. 2012, pp. 5451-5455.

Meng et al., "The Design and Analysis of Electronically Reconfigurable Liquid Crystal-Based Reflectarray Metasurface for 6G Beamforming, Beamsteering, and Beamsplitting", IEEE Access, vol. 4, 2016, 12 pages.

Ojaroudi et al., "Graphene-Based Reconfigurable Intelligent Meta-Surface Structure for THz Communications", 15th European Conference on Antennas and Propagation, 2021, 5 pages.

Tasci et al., "A New RIS Architecture With a Single Power Amplifier: Energy Efficiency and Error Performance Analysis", IEEE Access, Apr. 2022, 11 pages.

Bai et al., "RIS-Assisted Green Secure Communications: Active RIS or Passive RIS?", IEEE Wireless Communications Letters, Dec. 6, 2022, 5 pages.

Goldman et al., "SpaceX and T-mobile Focus on Direct Satellite-to-Smartphone to Improve Mobile Coverage in Remote Areas", Analysys Mason, Aug. 2022, 5 pages.

Jewett, Rachel, "How Big is the Satellite Industry's Direct-to-Device Opportunity?", Via Satellite, Sep. 12, 2023, Url-https://www.satellitetoday.com/connectivity/2023/09/12/how-big-is-the-satellite-industrys-direct-to-device-opportunity/, Retrieved from the internet Dec. 2, 2024, 4 pages.

"Electromagnetic Metasurface", Wikipedia, URL- https://en.wikipedia.org/wiki/Electromagnetic_metasurface#, Retrieved from the internet Dec. 2, 2024, 9 pages.

Schweber, Bill., "The Doppler Effect: From Highly Ridiculed to Absolutely Indispensable, Part 1", Electrical Engineering News and Products, Apr. 19, 2022, URL- https://www.eeworldonline.com/the-doppler-effect-from-highly-ridiculed-to-absolutely-indispensable-part-1/, Retrieved from the internet Dec. 2, 2024, 14 pages.

"Doppler Effect", Wikipedia, URL-https://en.wikipedia.org/wiki/Doppler_effect, Retrieved from the internet Dec. 2, 2024, 8 pages.

Long et al., "A Promising Technology for 6G Wireless Networks: Intelligent Reflecting Surface", Journal of Communications and Information Networks, vol. 6, No. 1, Mar. 2021, 16 pages.

Singh et al., "Recent Advancements in Reconfigurable mmWave Devices Based on Phase-Change and Metal Insulator Transition Materials", IEEE Journal of Microwaves, vol. 3, No. 2, Apr. 2023, pp. 827-851.

Rodrigues et al., "Efficient Power Allocation Strategies in Hybrid Active-Passive Reconfigurable Intelligent Surfaces", IEEE Communications Letters, vol. 28, No. 1, Jan. 2024, pp. 113-117.

Rodrigues et al., "Optimized Phase Shifts in Intelligent Reflective Surfaces for Robust Radar-based Indoor Coverage Enhancement", Proceedings of the SPIE, Radar Sensor Technology XXVII, vol. 12535, 2023. pp. 64-76.

3GPP TR 23.737 V17.0.0, "3rd Generation Partnership Project; Technical Specification Group Services and System Aspects; Study on architecture aspects for using satellite access in 5G, (Release 17)", Dec. 2019, 82 pages.

3GPP TR 28.808 V17.0.0, "3rd Generation Partnership Project; Technical Specification Group Services and System Aspects Study on Management and Orchestration Aspects of Integrated Satellite Components in a 5G Network, (Release 17)", Mar. 2021, 30 pages.

3GPP TS 38.108 V17.0.0, 3rd Generation Partnership Project; Technical Specification Group Radio Access Network; NR; Satellite Access Node radio transmission and reception,(Release 17), Jun. 2022, 58 pages.

"DVB", Wikipedia, URL-https://en.wikipedia.org/wiki/DVB, Retrieved from the internet Dec. 2, 2024, 12 pages.

"DVB-S", Wikipedia, URL-https://en.wikipedia.org/wiki/DVB-S, Retrieved from the internet Dec. 2, 2024, 2 pages.

"DVB-S2", Wikipedia, URL-https://en.wikipedia.org/wiki/DVB-S2, Retrieved from the internet Dec. 2, 2024, 7 pages.

"DVB-S2X", Wikipedia, URL-https://en.wikipedia.org/wiki/DVB-S2X, Retrieved from the internet Dec. 2, 2024, 2 pages.

The Ad Hoc Group., "White Paper on the use of DVB-S2X for DTH Applications, DSNG & Professional Services, Broadband Interactive Services and VL-SNR applications", Digital Video Broadcasting, Mar. 2015, 16 pages.

DVB ORG., "Implementation Guidelines for the Second Generation System for Broadcasting, Interactive Services, News Gathering and Other Broadband Satellite Applications; Part 2: S2 Extensions (DVB-S2X)", ETSI TR 102 376-2 V1.2.1, Jan. 2021, 212 pages.

DVB ORG., "Second Generation Framing Structure, Channel Coding and Modulation Systems for Broadcasting, Interactive Services, News Gathering and Other Broadband Satellite Applications; Part 2: DVB-S2 Extensions (DVB-S2X)", DVB Document A083-2 Rev.4, Feb. 2024, 166 pages.

"Facts and Figures 2022—Mobile Network Coverage 2022", ITU, URL - https://www.itu.int/itu-d/reports/statistics/2022/11/24/ff22-mobile-network-coverage/, Retrieved from the internet Dec. 2, 2024, 4 pages.

Kenfack et al., "Modeling of a DVB-S2 Transmission Chain with Optimization of Adjustment Parameters for a Good Quality of the Reception Signal", International Journal of Communications, Network and System Sciences, vol. 16, Jan. 31, 2023, pp. 1-20.

ETSI EN 300 421 V1.1.2, "Digital Video Broadcasting (DVB); Framing Structure, Channel Coding and Modulation for 11/12 Ghz Satellite Services", Aug. 1997, 24 pages.

ETSI EN 302 307-1 V1.4.1, "Digital Video Broadcasting (DVB); Second Generation Framing Structure, Channel Coding and Modulation Systems for Broadcasting, Interactive Services, News Gathering and Other Broadband Satellite Applications; Part 1: DVB-S2", Jul. 2014, 80 pages.

(56)          References Cited

OTHER PUBLICATIONS

ETSI EN 302 307 V1.2.1, Digital Video Broadcasting (DVB); Second Generation Framing Structure, Channel Coding and Modulation Systems for Broadcasting, Interactive Services, News Gathering and Other Broadband Satellite Applications (DVB-S2), Aug. 2009, 78 pages.
ETSI TR 102 376-1 V1.2.1, "Digital Video Broadcasting (DVB); Implementation Guidelines for the Second Generation System for Broadcasting, Interactive Services, News Gathering and other Broadband Satellite Applications; Part 1: DVB-S2", Nov. 2015, 118 pages.
ETSI TR 102 376-2 V1.2.1, "Digital Video Broadcasting (DVB); Implementation Guidelines for the Second Generation System for Broadcasting, Interactive Services, News Gathering and other Broadband Satellite Applications; Part 2: S2 Extensions (DVB-S2X)", Jan. 2021, 212 pages.
Lee et al., "Integrated DVB-X2 Receiver Architecture with Common Acceleration Engine", Applied Sciences, vol. 9, No. 3983, Sep. 23, 2019, 16 pages.
Nemer, Elias., "Physical Layer Impairments in DVB-S2 Receivers", Second IEEE Consumer Communications and Networking Conference, 2005, pp. 487-492.
DVB ORG., "White Paper on the use of DVB-S2X for DTH applications, DSNG & Professional Services, Broadband Interactive Services and VL-SNR applications", DVB Document A172, Mar. 2015, 16 pages.
Babcock, Stephen., "AT&T Invested $450M in Maryland Network Upgrades Over 3 Years", Technical.ly, URL-https://technical.ly/startups/att-invested-450m-in-maryland-network-upgrades-over-3-years/, Jul. 9, 2019, Retrieved from the internet Dec. 2, 2024, 7 pages.
Tyree et al., "AT&T Providing Cell on Wheels to Help with Internet Connection at LU's Graduation", URL—https://wset.com/news/local/att-providing-cell-on-wheels-to-help-with-internet-connection-at-lus-graduation, May 10, 2017, Retrieved from the internet Dec. 2, 2024, 6 pages.
ITU, "H.222.0 : Information Technology-Generic Coding of Moving Pictures and Associated Audio Information: Systems", International Telecom Union, Aug. 2018, 306 pages.
Cioni et al., "DVB-S2X Physical Layer Performance Results Over Realistic Channel Models", International Journal of Satellite Communications and Networking, vol. 34, No. 3, Jul. 2015, 21 pages.
"MPEG Transport Stream", Wikipedia, URL-https://en.wikipedia.org/wiki/MPEG_transport_stream, Retrieved from the internet Dec. 2, 2024, 10 pages.
Keese, Col. John E., "Satellite Telemetry, Tracking and Control Subsystems", Massachusetts Institute of Technology, Oct. 29, 2003, 35 pages.
NASA, "State-of-the-Art of Small Spacecraft Technology", NASA 9.0 Communications, Feb. 12, 2024, 32 pages.
Stuhlfauth, Reiner. "5G NTN Takes Flight: Technical Overview of 5G Non-Terrestrial Networks", Rohde & Schwarz, White Paper, Version 01.00, 2022, 124 pages.
Dhaou, Riadh. "Modeling of Networks Composed of Satellite Constellations" University of Paris VI Dissertation, Nov. 8, 2002 [https://www.researchgate.netpublication/265231818_MODELING_OF_NETWORKS_COMPOSED_OF_SATELLITE_CONSTELLATIONS], 225 pages.
"Aerial SDK Layer 1" Nvidia Docs Hub, https://docs.nvidia.com/aerial/archive/aerial-sdk/23-1/text/product_brief/aerial_sdk_layer_1.html] retrieved Jan. 16, 2025, 30 pages.
Notice of Allowance received for U.S. Appl. No. 18/609,134 dated Sep. 16, 2025, 11 pages.
Non-Final Office Action received for U.S. Appl. No. 18/656,441 dated Sep. 22, 2025, 7 pages.
Notice of Allowance received for U.S. Appl. No. 18/656,441 dated Nov. 19, 2025, 5 pages.
Notice of Allowance received for U.S. Appl. No. 18/739,880 dated Nov. 12, 2025, 10 pages.

Notice of Allowance received for U.S. Appl. No. 18/797,975 dated Sep. 19, 2025, 9 pages.
Healy, et al. "Layer-1 Physical Interface Transcoder Leveraging Metasurfaces" U.S. Appl. No. 18/899,886, filed Sep. 27, 2024, 63 pages.
Healy, et al. "Connecting Wi-Fi-Enabled Device to Non-Terrestrial Satellite Constellations" U.S. Appl. No. 18/899,909, filed Sep. 27, 2024, 55 pages.
Khaira, et al. "Layer-1 Physical Interface Transcoder With Signal Processing Capabilities to Support Hybrid Terrestrial and Non-Terrestrial Ground and Space Mesh Network" U.S. Appl. No. 18/902,052, filed Sep. 30, 2024,79 pages.
Healy, et al. "Universal Layer-1 Physical Interface Transcoder for Terrestrial and Non-Terrestrial Air-Interfaces" U.S. Appl. No. 18/899,739, filed Sep. 27, 2024, 62 pages.
Singh, et al. "Edge Computing and Metasurfaces in Non-Terrestrial Network-Connected Transcoder Nodes" U.S. Appl. No. 18/902,158, filed Sep. 30, 2024, 66 pages.
Healy, et al. "High-Availability Communication Link That Supports Terrestrial and Non-Terrestrial Networks Including for Disaster-Relief and Emergency Management Services" U.S. Appl. No. 18/902,268, filed Sep. 30, 2024, 75 pages.
Singh, et al. "Allocating Primary and Secondary Metasurface Integrated Non-Terrestrial Network Transcoder Nodes" U.S. Appl. No. 18/902,360, filed Sep. 30, 2024, 64 pages.
Healy, et al. "Model-Controlled Layer-1 Physical Interface Transcoder to Support Hybrid Terrestrial and Non-Terrestrial Ground and Space Mesh Network" U.S. Appl. No. 18/899,504, filed Sep. 27, 2024, 64 pages.
Khaira, et al. "Enhancing Network Resiliency and Performance Through Multipath Routing With Metasurface-Integrated Portable Transcoder" U.S. Appl. No. 18/902,395, filed Sep. 30, 2024, 50 pages.
Singh, et al. "Secure Non-Terrestrial Network Links Utilizing Quantum Key Distribution Integrated Into a Metasurface Transcoder Node With Hardware Polarization Control" U.S. Appl. No. 18/902,422, filed Sep. 30, 2024, 37 pages.
Singh, et al. "Signal Correction Based on Environmental Factors in Metasurfaces for Non-Terrestrial Network Transcoder Nodes" U.S. Appl. No. 18/902,454, filed Sep. 30, 2024, 53 pages.
Singh, et al. "Reconfigurable Intelligent Surface Integrated on Compact Drones for Wireless Network Survey" U.S. Appl. No. 18/913,434, filed Oct. 11, 2024, 36 pages.
Khaira, et al. "Energy-Efficient Active Reconfigurable Intelligent Surface With Integrated Sub-Array Power Amplifiers and Signal Coupling" U.S. Appl. No. 18/586,838, filed Feb. 26, 2024, 33 pages.
Khaira, et al. "Energy-Efficient Active Reconfigurable Intelligent Surface With Selective Amplification" U.S. Appl. No. 18/609,134, filed Mar. 19, 2024, 39 pages.
Singh, et al. "Real-Time Data Management and Integrity Assurance for Artificial Intelligence-Driven Millimeter Wave Advanced Metasurfaces" U.S. Appl. No. 18/656,407, filed May 6, 2024, 44 pages.
Singh, et al. "Reconfigurable Intelligent Surfaces That Self Heal and Adapt by Altering the Tile Geometry" U.S. Appl. No. 18/656,431, filed May 6, 2024, 74 pages.
Singh, et al. "Predictive Signal Boosting in Distributed Tile Controllers for Reconfigurable Metasurfaces" U.S. Appl. No. 18/656,441, filed May 6, 2024, 54 pages.
Ye, et al. "Enhancing Non-Terrestrial Network Direct-to-Everything Service With Metasurfaces" U.S. Appl. No. 18/739,880, filed Jun. 11, 2024, 39 pages.
Singh, et al. "Metasurface Subarrays With Integrated Amplification and Tunable Delay for Estimating Angle of Arrival and Redirecting Wireless Signals" U.S. Appl. No. 18/750,710, filed Jun. 21, 2024, 41 pages.
Healy, et al. "Transcoding the Air-Interface Between Non-Terrestrial and Terrestrial Networks Leveraging Integrated Transcoder and Metasurface Mounted on a Drone" U.S. Appl. No. 18/780,254, filed Jul. 22, 2024, 61 pages.
Healy, et al. "Communication Between Non-Terrestrial and Terrestrial Networks Based on Layer-1 Physical Packet-Level Transcoding" U.S. Appl. No. 18/780,269, filed Jul. 22, 2024, 59 pages.

(56) References Cited

OTHER PUBLICATIONS

Singh, et al. "Reconfigurable Intelligent Surface With Variable Amplification and Attenuation Including Angle of Arrival Estimation of Wireless Signals" U.S. Appl. No. 18/797,975, filed Aug. 8, 2024, 46 pages.

Notice of Allowance mailed Mar. 19, 2026 for U.S. Appl. No. 18/656,407, 86 pages.

* cited by examiner

750

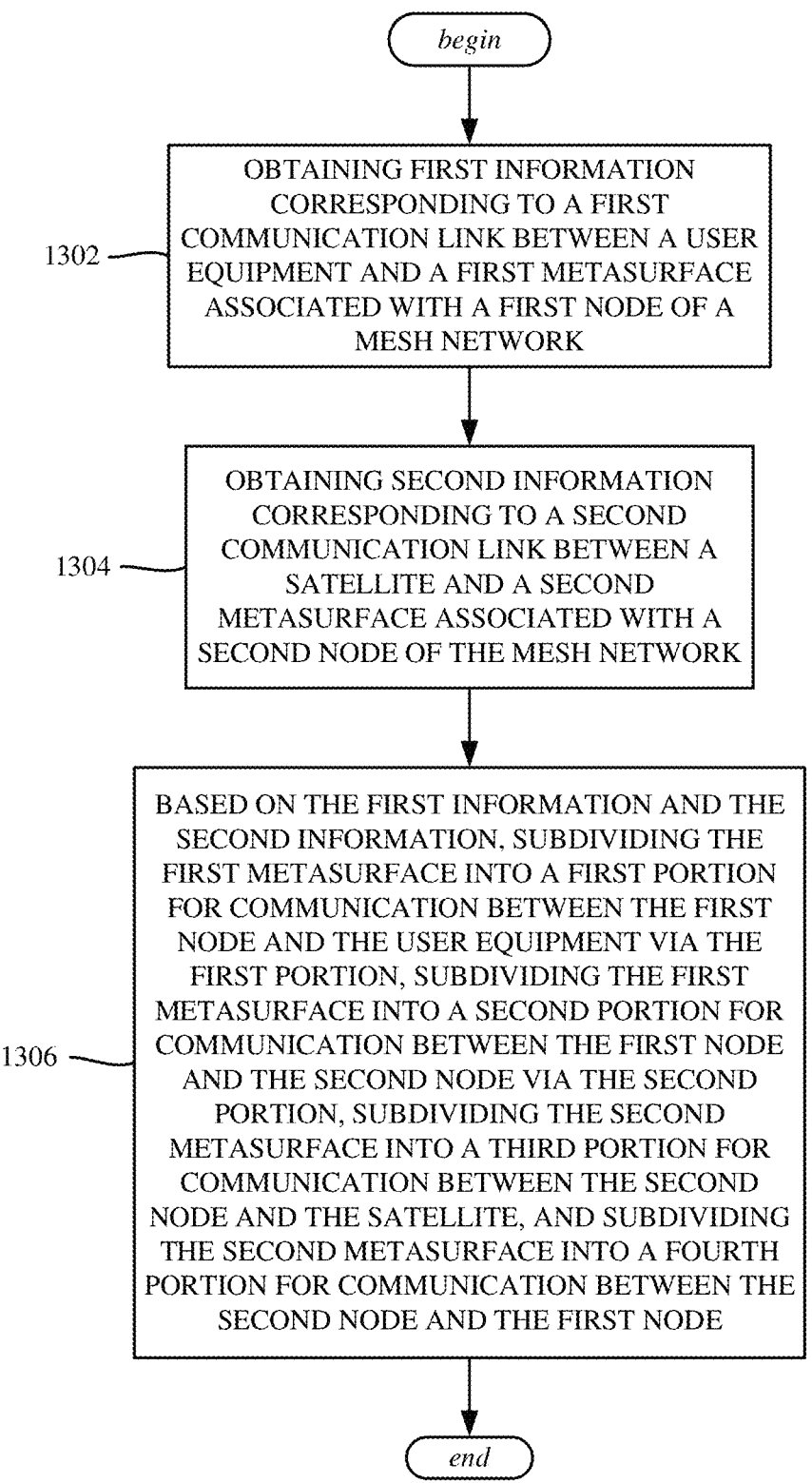

begin

1302 — OBTAINING FIRST INFORMATION CORRESPONDING TO A FIRST COMMUNICATION LINK BETWEEN A USER EQUIPMENT AND A FIRST METASURFACE ASSOCIATED WITH A FIRST NODE OF A MESH NETWORK

1304 — OBTAINING SECOND INFORMATION CORRESPONDING TO A SECOND COMMUNICATION LINK BETWEEN A SATELLITE AND A SECOND METASURFACE ASSOCIATED WITH A SECOND NODE OF THE MESH NETWORK

1306 — BASED ON THE FIRST INFORMATION AND THE SECOND INFORMATION, SUBDIVIDING THE FIRST METASURFACE INTO A FIRST PORTION FOR COMMUNICATION BETWEEN THE FIRST NODE AND THE USER EQUIPMENT VIA THE FIRST PORTION, SUBDIVIDING THE FIRST METASURFACE INTO A SECOND PORTION FOR COMMUNICATION BETWEEN THE FIRST NODE AND THE SECOND NODE VIA THE SECOND PORTION, SUBDIVIDING THE SECOND METASURFACE INTO A THIRD PORTION FOR COMMUNICATION BETWEEN THE SECOND NODE AND THE SATELLITE, AND SUBDIVIDING THE SECOND METASURFACE INTO A FOURTH PORTION FOR COMMUNICATION BETWEEN THE SECOND NODE AND THE FIRST NODE end

FIG. 13

METASURFACE INTEGRATED NON-TERRESTRIAL NETWORK TRANSCODER WITH ADAPTIVE SLICING FOR DYNAMIC ALLOCATION OF MESH RESOURCES

RELATED APPLICATION

The subject patent application is related to U.S. patent application Ser. No. 18/780,254, filed Jul. 22, 2024, and entitled "TRANSCODING THE AIR-INTERFACE BETWEEN NON-TERRESTRIAL AND TERRESTRIAL NETWORKS LEVERAGING INTEGRATED METASUR-FACES", the entirety of which patent application is hereby incorporated by reference herein.

BACKGROUND

Non-terrestrial network communications are defined as part of fifth generation (5G) communications in current third generation partnership project (3GPP) standards. However, the reliability of non-terrestrial network satellite direct-to-device service is problematic, especially when a user equipment (UE) moves to an indoor environment, due to various radio frequency signal attenuations introduced by a roof, wall, or other physical structures that are between a satellite and the UE. As such, present satellite communication (non-terrestrial network) services basically require a line-of-sight (LoS) path between a satellite and a user equipment device to reduce radio frequency signal fading or shadowing in order to provide reliable communication.

Still further, the air-interfaces of satellite communications (Satcom, sometimes "SatCom" and other times "SAT-COM") and those used for terrestrial mobile wireless (5G, LTE and the like) have significant differences, including having to comply with different standards from one another. Further, the need for data privacy, while efficiently managing resources and maintaining high-quality connections across both terrestrial and non-terrestrial networks, is complicated.

BRIEF DESCRIPTION OF THE DRAWINGS

The technology described herein is illustrated by way of example and not limited by the accompanying figures in which like reference numerals indicate similar elements and in which:

FIG. 13 is a flow diagram showing example operations related to subdividing metasurface for user equipment communications, satellite communications, and mesh network communications, in accordance with various example embodiments and implementations of the subject disclosure.

DETAILED DESCRIPTION

Figure 1:
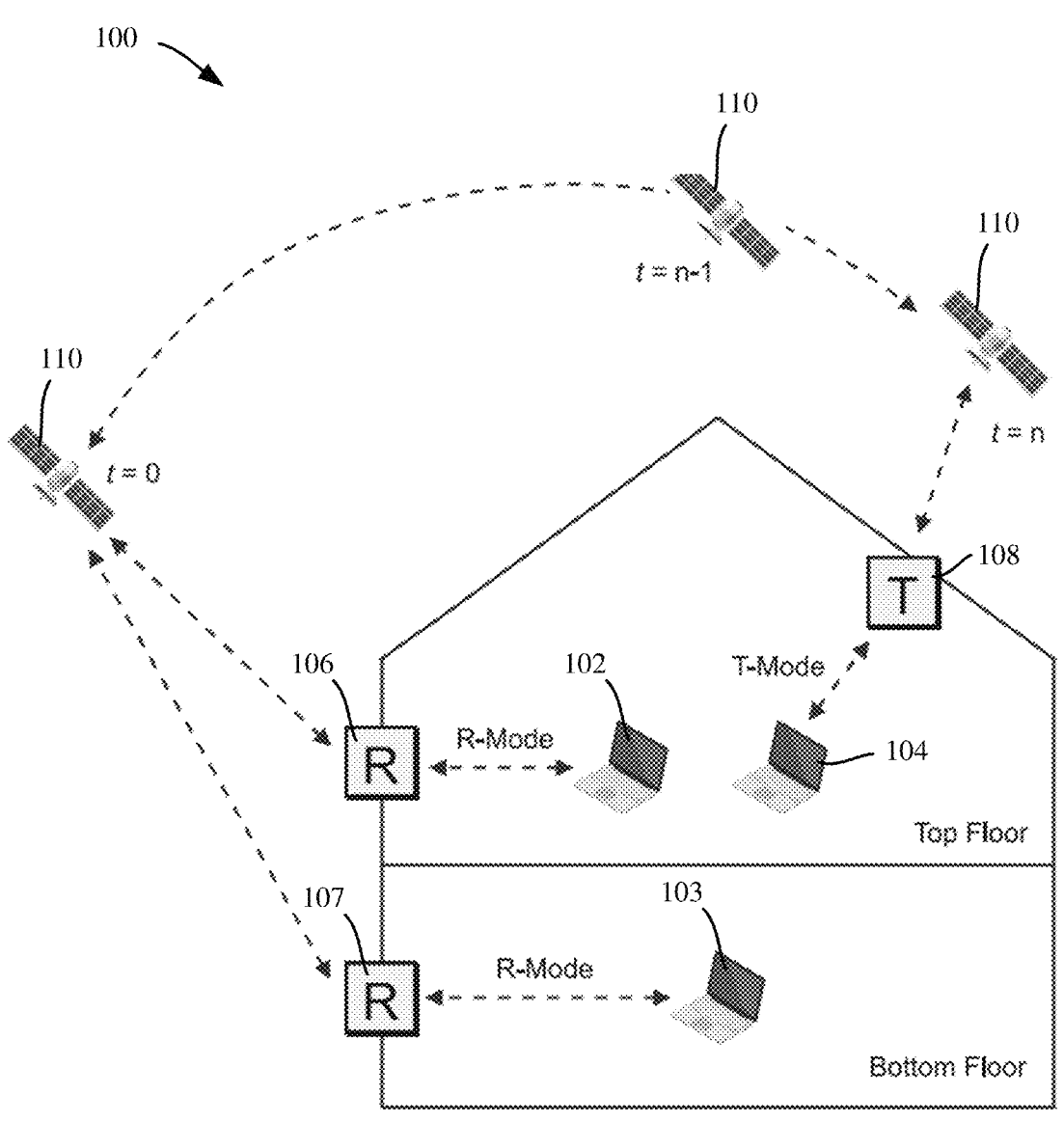
FIG. 1 is a representation of multiple example locations for deploying a metasurface (reconfigurable intelligent surface, or RIS) indoors, including metasurfaces configured to operate in a transmission mode and reflection mode, in accordance with various example embodiments and implementations of the subject disclosure.

The technology described herein is generally directed towards connecting user equipment type modems (e.g., 3GPP-compliant 4G/5G commercial off the shelf devices and beyond) to the legacy satellite satcom communication protocol, whereby user equipment (UE) are able to communicate with satellite services. Significantly, via a Layer-1 physical (L1-PHY) transcoder, the technology described herein provides the capability for the UE to communicate with a low earth orbit (LEO) satellite or a terrestrial tower using two different air-interfaces. The two air-interfaces include the DVB-compliant Satcom interface and 3GPP-compliant fifth generation new radio (5G NR) Direct-to-Device (D2D) interface. This dual RF capability allows the L1-PHY transcoder to operate at two different frequency bands, legacy satcom and the newer 3GPP FR1/FR2 bands.

The technology described herein operates, in part, by dynamically slicing (subdividing) a metasurface associated with a transcoder node, such as for mesh network communications to another node via one metasurface slice while using another metasurface slice for non-terrestrial communications with a satellite. The slicing can be performed based on on-device learning and multi-model AI features. The system allocates resources effectively to maintain robust connectivity and signal amplification. This approach not only improves network performance but also ensures data privacy, providing a viable solution for managing complex and adaptive network environments.

Further, the integration of a metasurface, or reconfigurable intelligent surface (RIS integration) facilitates portability and disaggregation. More particularly, while the indoor radio frequency (RF) signal is converted using the transcoding technology described herein, the indoor RF signal needs to get outdoors to achieve line-of-sight (LoS) connectivity directly to the satellite. RIS technology provides the capability to transmit the indoor RF signal to the outdoor environment, that is, transmit the UE signal from indoors-to-outdoors and outdoors-to-indoors wirelessly, eliminating the need for a physical cable to connect a mounted outdoor antenna to indoor UEs. Among other benefits, a RIS also adds the benefit of portability, and different ways to deploy the transcoder device. For example, the transcoder device can be standalone box, integrated into an antenna, tether-box attached to notebook, and so on. The transcoder device and RIS also can be disaggregated, e.g., to have some components/features in a computing device such as a notebook, and other components/features in an external RIS/antenna.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and metasurfaces in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a representation of an example environment 100 including user equipment 102-104 operating indoors, and metasurfaces 106-108. As described herein, the metasurfaces 106-108 are used to offer signal boost in the 3GPP standardized non-terrestrial network frequency bands.

In general, a metasurface (sometimes referred to as a reconfigurable intelligent surface, or RIS) of unit cells is deployed between a satellite and a user equipment (UE). The metasurface can be configured to act as a passive signal gain booster to provide a reliably connected non-terrestrial network service, including in indoor UE scenarios. There is significant signal attenuation experienced by non-terrestrial network services with respect to penetrating indoor environments. Such variability in attenuation, influenced by construction materials and their moisture content, impedes the reliability and performance of direct-to-device connections. This attenuation can range from minimal to severe, ranging from 3 dB (50%) to virtually complete attenuation;

for example, metal roofing and attics equipped with radiant barriers present the most challenging conditions, exhibiting signal losses up to 30 dB (99.9% reduction).

To counteract such signal attenuation challenges, the integration of metasurface technology as described herein facilitates non-terrestrial network direct-to-everything service reliability, by using a (for example portable) designed metasurface to boost the attenuated RF signals to and from a satellite, to ensure an end-to-end link supporting always-on connectivity. In general, metasurfaces are surfaces engineered to manipulate electromagnetic waves, offering a pathway to enhance signal strength in either reflection or transmission modes. A metasurface such as described herein can be designed in a way that reduces the fabrication costs exponentially relative to other technologies, as in general a metasurface only needs a single layer of metallization on a substrate. The metasurface can be used for direct-to-everything (DTX) communications, including with smartphones, laptops, automotive vehicles, IoT devices, or inter-device communication, as long as the operating RF frequency is within the gain band of specially designed metasurface.

One implementation of the technology described herein includes a passive (no power needed) metasurface that can be reconfigured into reflection mode or transmission mode by simply attaching or removing a metallic backplane to or from the metasurface. More particularly, a passive metasurface signal booster does not require power to function, and the reconfiguration to the reflection mode can be achieved by attaching a metallic back plane panel to the underside of the metasurface, or removing the back plane to achieve transmission mode. These designs add additional benefits to ensure non-terrestrial network connectivity even during a power outage, which is significant for the safety and emergency response community.

In one implementation, the metasurface can be sufficiently small in size so as to be portable, which can be carried when traveling or moved within a building as needed to enhance the signal strength with respect to non-terrestrial network uplink and downlink communications. The portability of the metasurface allows a user to test out multiple candidate positions, using either a transmission mode or a reflection mode of the metasurface within the targeted indoor environment. In this way, the user knows ahead of time that the non-terrestrial network service is not limited to a single spot. This significantly increases the convenience for the user; for example, in a scenario where the roofing material of a target building only has a few dB of attenuation at non-terrestrial network service link frequency, the metasurface booster gain operating in the transmission mode is adequate to compensate for that small loss. This removes the line-of-sight requirement between the user equipment and the satellite field of view. In general, a user can sit anywhere in a room with boosted non-terrestrial network signal through the transmission mode of a suitably placed portable metasurface, which further enhance the flexibility of the non-terrestrial network service.

In general, a satellite is always in the (low attenuation) field-of-view of a metasurface with respect to the non-terrestrial network (NTN) frequency bands; before one NTN communications satellite travels out of the field of view, another one moves in. Although only a single satellite 110 is depicted in FIG. 1 (at different times t=0, t=n−1 and t=n), it is understood that at least one satellite is typically always within the field of view of any of the metasurfaces 106-108.

In FIG. 1, the two reflecting mode ("R") metasurfaces 106 and 107 and one transmission mode ("T") metasurface 108 provide satellite communication signals to and from user equipment, e.g., laptop or notebook computers 102-104. Note that instead of multiple UE computers 102-104, a single computer can be moved among the various coverage locations of the metasurfaces 106-108.

Figure 2A:
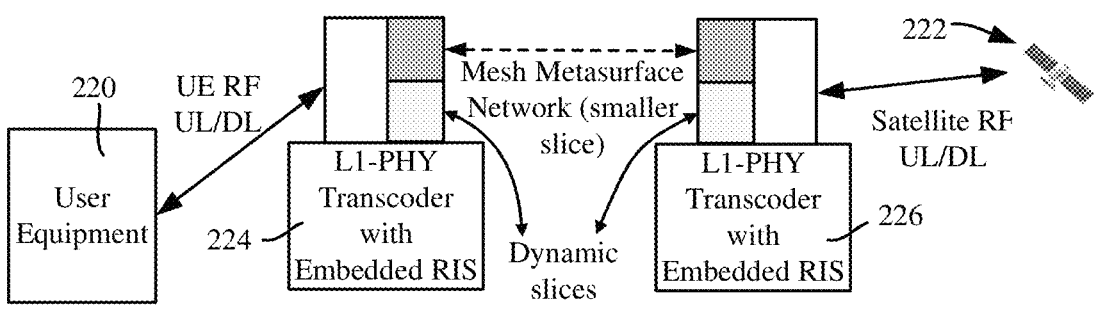
FIG. 2A is a representation of example uplink (UL) and downlink (DL) communication paths between a user equipment to a satellite via layer-1 physical conversion (L1-PHY) transcoders and metasurfaces of a mesh network, in which the dynamic slicing in metasurfaces facilitates the mesh network and communications, in accordance with various example embodiments and implementations of the subject disclosure.

FIG. 2A shows one possible physical form factor for a system/architecture in which a user equipment 220 communicates (in uplink/UL and downlink DL directions) with a satellite 222, via mesh network including at least two L1-PHY transcoder nodes/devices 224 and 226; the interfaces are radio frequency (RF) interfaces. In this example, each of transcoder nodes/devices 224 and 226 has a subdivisible metasurface as described herein. Note that due to the constant, real-time interactions of the L1-PHY transcoder and RIS components, integrating the components into one single transcoder device is desirable; however separate RIS component that are independent of the L1-PHY transcoder devices can be used. As described herein, an edge compute device is included in the L1-PHY transcoder node 224.

As shown in FIG. 2A, dynamic metasurface slicing, that is, subdividing of the metasurfaces into separate portions is described, including when integrated into a transcoder node as a single unit solution. For example, one slice of the metasurface of the L1-PHY transcoder node 224 is used to communicate with the UE 220, and another slice is for mesh network communications with the L1-PHY transcoder node 226; (yet another slice can be a dynamic slice, such as for communicating with one or more additional UEs). In FIG. 2A, one slice of the metasurface of the L1-PHY transcoder node 226 is used to communicate with the satellite 222, and another slice is for mesh network communications with the L1-PHY transcoder node 224; (yet another slice can be a dynamic slice, such as for communicating with any other appropriate entity as needed, e.g., a UE, a different node of the mesh network, and so on). By leveraging metasurface technology, multiple edge-enabled transcoder boxes can communicate with each other, creating a mesh network that enhances overall system performance and reliability. The system can grow with increasing data and application demands by integrating additional edge nodes as needed. Note that all slicing can be dynamic, e.g., a poor connection to the satellite can be enhanced by dynamically increasing the slice size for satellite communications relative to other slice sizes.

Figure 2B:
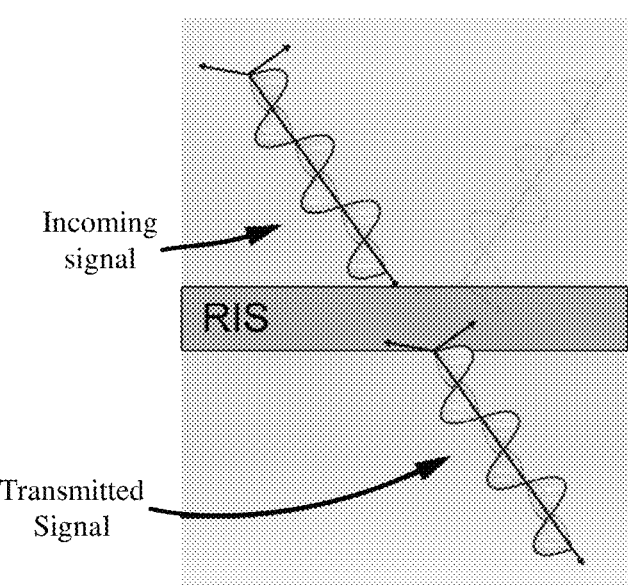
FIGS. 2B and 2C are representations of example metasurfaces configured to operate in a transmission mode and reflection mode, respectively, in accordance with various example embodiments and implementations of the subject disclosure.
Figure 2C:
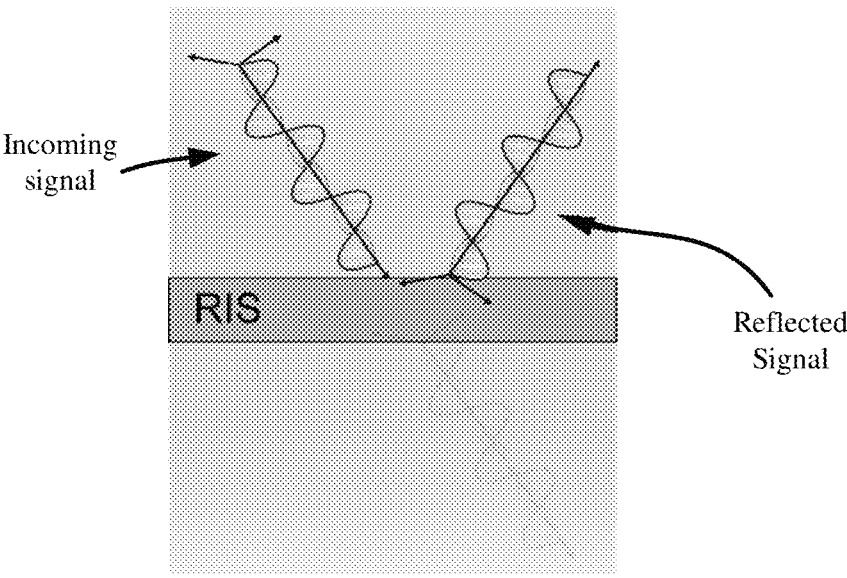

FIGS. 2B and 2C illustrate how an electromagnetic (EM) wave can be redirected by a reflective intelligent surface (RIS), through transmission or reflection, that is, FIGS. 2B and 2C show the concept of a metasurface (reconfigurable intelligent surface, or RIS) in transmission and reflection modes, respectively. As can be seen, in the transmission mode of FIG. 2B, the RIS is basically transparent to the incoming signal, and as described herein (and not explicitly shown in FIG. 2B), respective unit cells of the RIS can be designed with different phase shifts so as to passively refract respective portions of the incoming signals and thereby boost the incoming signal via constructive interference (gain array) of the different refracted respective portions of the incoming waves as refracted by the respective unit cells. Similarly, in the reflection mode of FIG. 2C, the RIS basically reflects a very large percentage of the incoming signal, and as described herein, the respective unit cells of the RIS can be designed with different respective phase shifts so as to passively reflect respective portions and boost via gain array the incoming signal via constructive interference of the different reflected respective portions of the incoming waves as reflected by the respective unit cells.

As set forth herein, the range of signal attenuation (e.g., in dB/inch) is different for various commonly used building materials such as plywood, clear glass, cinder block, drywall, and ceiling tile; each material's attenuation properties change with frequency. These building materials have lower attenuation (non-negligible) at lower frequencies, however as expected, the attenuation increases as the frequency rises, which indicates that higher frequencies face greater attenuation, which is a challenge for direct-to-device services that operate at these frequencies. However, the metasurfaces 106-108 in FIG. 1 are positioned to mitigate the attenuation issue, e.g., the two reflecting mode ("R") metasurfaces 102 and 103 can be placed by windows or behind other low-attenuation materials, while the transmitting mode metasurface 104 can be placed near the ceiling or in line with a skylight so as to have a reasonable line-of-sight connection (i.e., low attenuation conditions) with any position of any satellite in each metasurface's field of view.

Turning to satellites in general, satellite communications (satcom) have long been commercialized to provide mobile (aviation, sea, railroad), fixed (isolated rural area), and broadcast services for decades, while the terrestrial network has gone through 2G, 3G, 4G and 5G evolutions. With 3GPP now adding non-terrestrial networks (NTN) in the standards definition of 5G, satellite direct-to-device is likely to be used with smartphones, sensors, laptops and connected vehicles, wherever stable connectivity can be assured between such user equipment and a satellite. Indeed, 3GPP NR-non-terrestrial network standards enable non-terrestrial network direct-to-everything services, by defining a high-level architecture that is compatible with most mobile handsets and internet-of-things (IoT) devices, as well as defining the operating bands in FR1 for UE to transmit and receive data with a satellite. The following table 1 shows the satellite operating bands in FR1 as defined by 3GPP Release 17:

the input protocols, formatting, and so forth, in the appropriate output format for the receiving entity. Note that such transcoding is not needed for the new radio non-terrestrial networks, e.g., using FR1 and FR2 bands as described herein. While these modules as described herein are shown separated in one example implementation, this is only one non-limiting example, and the various functionality performed thereby can be divided among more modules, and/or at least some of the example modules can be combined together to perform the transcoding-related functionality as described herein.

Figure 3:
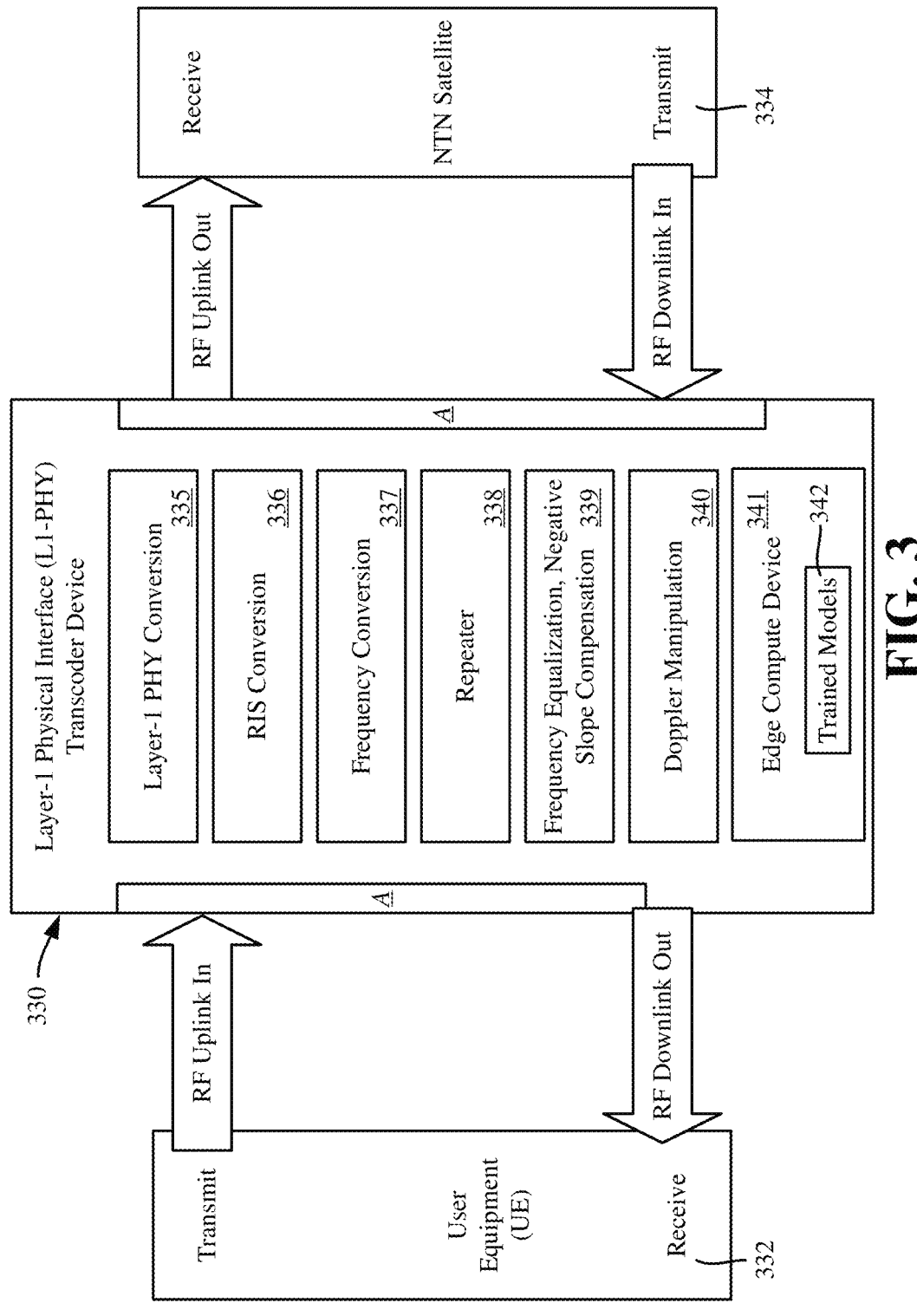
FIG. 3 is a block diagram showing an example hardware-based transcoder device in which radio frequency (RF) downlink and uplink signals are connected for RF input and output, in accordance with various example embodiments and implementations of the subject disclosure.

In the example of FIG. 3, when transcoding (5G to or from Satcom) is appropriate, a layer-1 physical interface (L1-PHY) transcoder conversion device 335, with bypass capability, performs L1-PHY gate-level packet-level conversion. As shown in more detail in FIG. 4, L1-PHY gate-level packet-level conversion is performed in the UE uplink direction, from the RF front-end control interface (RFFE) 443/(e.g., 5G NR) decode (block 444), to the packet-level satcom encoded (block 445)/RFFE 446 satellite uplink. In the satellite downlink direction, the L1-PHY transcoder conversion module 335 performs packet-level satcom-to-RFFE 453 decode operations (block 454) to 5G NR encoded (block 456)/RFFE 457 user equipment downlink packets. As shown in FIG. 3, one or more antennas A couple the transcoder device 330 to the user equipment 332 and the NTN satellite 334, which may be via a metasurface (also referred to as a reconfigurable intelligent surface, or RIS 450) as described herein.

More particularly, in the uplink direction from the UE, the L1-PHY conversion module 335 of the transcoder device 330 decodes (block 442) the 5G NR terrestrial air-interface down to the native digital packet-level. Then the L1-PHY

TABLE 1

| Satellite operating band | Uplink (UL) operating band SAN receive/UE transmit $F_{UL,\ low}$-$F_{UL,\ high}$ | Downlink (DL) operating band SAN transmit/UE receive $F_{DL,\ low}$-$F_{DL,\ high}$ | Duplex mode |
|---|---|---|---|
| n255 | 1626.5 MHz-1660.5 MHz | 1525 MHz-1559 MHz | FDD |
| n256 | 1980 MHz-2010 MHz | 2170 MHz-2200 MHz | FDD |

Note that 3GPP is currently considering new radio (NR)-non-terrestrial networks above 10 GHz in the FR2 band. The Ka-band is the highest-priority band with uplinks between 17.7 and 20.2 GHz and downlinks between 27.5 and 30 GHz, based on ITU (International Telecommunication Union) information regarding satellite communications frequency use. It is expected that FR2 band will be standardized in the future 3GPP releases.

In one or more example implementations, as shown in FIG. 3, described herein is a transcoder device 330 (e.g., in the structure of a "box") that couples a user equipment 332 to a non-terrestrial network (NTN) satellite 334 with respect to RF uplink signals from the user equipment 332 to the satellite 334, and RF downlink signals from the satellite 334 to the user equipment 332. Various types of user equipment can include, but are not limited to, personal (e.g., notebook/ laptop) computers, other computing devices, cellphones, wireless-tether-boxes, fixed wireless access (FWA)-boxes, and IoT/NB-IoT (internet of things/narrowband-internet of things) devices.

As shown in FIG. 3, a number of hardware and/or software-based modules/components 335-341 perform various functions related to the transcoding of RF input to RF output, in both uplink and downlink directions, according to conversion module 335 reencodes (block 443) the packets into the legacy satcom air-interface protocol. The downlink direction is the inverse, that is, the L1-PHY conversion module 335 decodes (block 446) the satcom protocol to the packet-level, then reencodes (block 447) to the 5G NR air-interface protocol.

An uplink bypass path is also available for D2D 5G NR, e.g., as represented by the uplink input signal being coupled to one input of an uplink multiplexer (UL Mux) 447. Note that although not explicitly shown in FIG. 4, an optional frequency converter in the uplink bypass path may be present and invoked for situations where the user equipment does not support the 5G NR satellite frequency band(s).

Thus, as described herein, the dual-band device includes an uplink multiplexer (UL Mux) 457 that facilitates selecting between which path to take to transmit to the NTN satellite 334, namely the transcoder/conversion state for Satcom, or the D2D state 5G NR. A control signal CTL[0] determines which state is selected, e.g., as determined by a trained system control and switching model controller as described herein, which in one or more example implementations is a trained artificial intelligence (AI) model.

In one implementation, the uplink multiplexer 457 is a 2X1 Mux that selects between the uplink "Satcom" pipeline path or the "D2D 5G NR" path. The uplink multiplexer 457 can be a dumb hardware Mux, physically selecting the uplink path, e.g., with no dynamically switching Mux features on its own.

Figure 4:
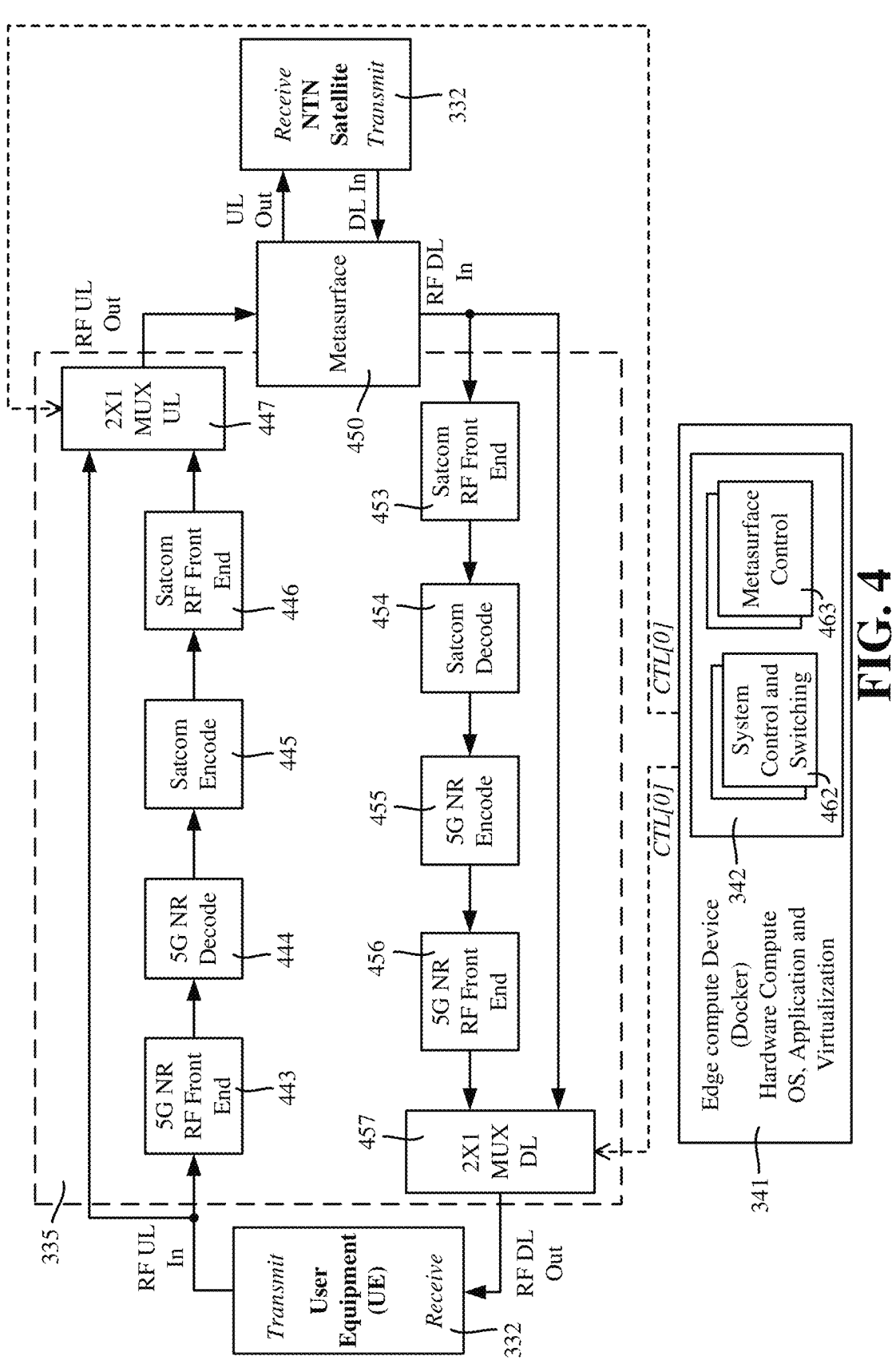
FIG. 4 is a block diagram showing an example L1-PHY module/component of a transcoder device, with bypass capability, and with an edge compute device, in accordance with various example embodiments and implementations of the subject disclosure.

FIG. 4 also shows that the output of the 2X1 UL Mux 457 feeds the RIS component 450. The RIS component 450 may be programmed or otherwise configured to operate with multiple frequencies from the Mux output.

With respect to 5G decoding and reencoding in the transcoder conversion pipeline path, note that the 3GPP-compliant 5G NR Layer-1 physical interface logic block diagram is published. The following summarizes some features of 5G NR direct-to-device (D2D) operations and concepts with respect to NTN satellites:

$NTN$ Mode = $3GPP$ Transparent−Mode $L1$−Physical Interface = $3GPP$−compliant Layer−1 $PHY$ logic blocks Bands = mobile network operator($MNO$) terrestrial frequency bands Service−Link = direct−to−device mode (mobile wireless) air−interface Feeder−Link = repeated, amplified, frequency−converted to $NTN$ Gateway frequency−band air interface Antenna Technology = varies, depends on $FR1/FR2/NTN$ bands Physical Constraints = mobile wireless operation, physical challenges Interference, Weather, Scintillation, Channel Modeling, Link−Budget Analysis = mobile wireless operation, various challenges Use−Case/Market/Protocol = $IoT$, $NB$−$IOT$, RedCap, $5G$ $NR$ Packet−Format/Tunneled−Packet = $3GPP$ $GTP$−Tunnel, $IP$, $UDP$, etc.

For the air interface, note that satcom (Digital Video Broadcasting (DVB)-Compliant L1-PHY details are published, including a logic block diagram of a DVB-compliant DVB-S2 Layer-1 Physical Interface (L1-PHY). The logic lites support the early DVB-S standards. Over the years the DVB consortium has moved from the original DVB-S to DVB-S2 to DVB-S2 to the latest DVB-S2X. The following summarizes some features of satcom operation:

$NTN$ Mode = $satcom$, legacy $DVB$ standards $L1$−Physical Interface = $satcom$ $DVB$ protocol $L1$−$PHY$ logic blocks Bands = $satcom$ satellite frequency bands, $K$, $Ku$, $Ka$, $Q/V$, $S$, $L$ Service−Link = $satcom$ air−interface Feeder−Link = $satcom$ air−interface Antenna Technology = varied, depends on $K$, $Ku$, $Ka$, $Q/V$, $S$, $L$ bands Physical Constraints = mobile and static wireless operation, physical challenges Interference, Weather, Scintillation, Channel Modeling, Link−Budget = mobile and static wireless operation, various challenges Use−Case/Market/Protocol = $satcom$ $L1$−$PHY$, satellite broadband providers, military, governments Packet−Format/Tunneled−Packet = $satcom$, varied packet formats through the years.

A comparison of 5G NR and satcom air-interfaces is shown in the Table 2 below summarizing the above features used by the 3GPP terrestrial mobile wireless industry and the satcom satellite industry. The frequency bands are different from one another, and the frequencies are approved through two different standards organizations, 3GPP and DVB. Some satcom bands have been used for satellite communication for over twenty years, while 3GPP 5G NR bands were allocated around approximately 2015.

TABLE 2

| | satcom | 3GPP 5G NR D2D |
|---|---|---|
| L1-PHY | DVB-S/S2/S2X | 3GPP 5G NR L1 PHY |
| Air Interface | satcom DVB-S/S2/S2X | 3GPP Rel19 5G NR |
| Freq Bands | Bands K, Ku, Ka, Q, V, S, L (WRC allocated) | FR1/FR2/NTN MNO bands approved by 3GPP and WRC |
| Market | Mobile wireless, VSAT Broadband, fixed-satellite serves (FSS), IoT/NB-IOT | Direct-to-Device (D2D), UE talks directly to satellite, IoT/NB-IOT, RedCap, FWA Broadband |
| Use Case | Broadband, disaster-relief, emergency comms, | Personal cell, notebook, any UE |
| Users | VSAT, govt, military, broadband customers, | Mobile wireless subscribers/Mobile Network Operator (MNO) |
| Satellite Era (legacy/new) | Legacy and new satellites | NA |
| Constellations | STARLINK, KUIPER, ONEWEB, DISH/HUGHES/ ECHOSTAR, SDA, GLOBALSTAR, IRIDIUM, AST, ATT, TELESAT, etc. | NA (limited support for 3GPP transparent-mode, no support for regenerative-mode) |
| Terrestrial Network | NA | 5G NR | blocks used on the L1-PHY portion of the satcom can be specific to the DVB-standardized satcom protocol; the DVB standards are global standards that have defined the satcom protocol for many years, and many deployed legacy satel- As described herein, the transcoder device 330 can be integrated with reconfigurable intelligent surface (RIS) technology to relay the satellite downlink signal into the indoor environment, and vice-versa to relay the indoor UE signalto-satellite uplink. This removes the constraints of line-of-sight (LoS) between the UE and satellite.

Returning to FIG. 3, metasurface or RIS conversion, represented by block 336, is included for both the UE-side and the satellite-side. A metasurface, or RIS can be used to convert the downlink signal received from the satellite 334 for redirection to the UE 332 by including a frequency converter in between and boosting the signal amplitude, which can be, at least in part, by passive array gain. The metasurface can be similarly used with the uplink signal received from the UE 332 for redirection to the satellite 334. This conversion is not limited to amplitude, but can also include phase change, signal leveling, distortion compensation, up conversion, down conversion, and/or the like, by integrating radio frequency integrated circuit (RFIC) circuitry with the RIS conversion 336 functionality.

With respect to satellite and user equipment frequencies, terrestrial and non-terrestrial networks use different frequency bands, without any sharing therebetween, resulting in issues in the merging of terrestrial and non-terrestrial networks when it comes to frequency bands and air-interfaces. One challenge is that, when using mobile network operator frequency bands or satellite (satcom) frequency bands, there are significant band-rights regulation issues.

The following table 3 shows some satcom and terrestrial frequency bands:

TABLE 3

| Frequency Bands | Service-Link | |
| | Uplink | Downlink |
| --- | --- | --- |
| Terrestrial (5G NR) Bands | FR1 (Sub-6 GHz) | FR1 (Sub-6 GHz) |
| Mobile Network Operator (MNO) | FR2 (mm Wave) | FR2 (mm Wave) |
| Satcom Bands | L-Band | L-Band |
| | S-Band | S-Band |
| | Ku-Band | Ku-Band |
| | K-Band | K-Band |
| | Ka-Band | Ka-Band |
| | Q/V -Bands | Q/V -Bands |

Frequency conversion is thus needed for the transcoding, and as described herein block 337 represents converting between the 3GPP air-interface and the satcom air-interface frequencies. As is understood, this includes mobile network operators (e.g., 5G)-to-satcom frequency (band) conversion, and satcom-to-mobile network operator frequency (band) conversion. In general, frequency conversion at satellite frequencies is well understood and not described in detail herein, except to reiterate that the frequency conversion of block 337 includes satcom-to-5G and 5G-to-satcom frequency conversion.

A repeater (block 338) can perform other functions, such as including, but not limited to, re-clocking, amplification, and power level adjustment, and can be based on a generic transponder/frequency converter, where in general, a transponder is a broadband RF channel used to amplify one or more carriers on the downlink side of a geostationary communications satellite. A transponder is simply a repeater that takes in the signal from the uplink at one frequency, amplifies the signal and sends it back on another frequency. Satellites can have bent-pipe repeaters, which receive signals in the uplink beam, block translates them to the downlink band, and separates them into individual transponders of a fixed bandwidth. A transponder can be amplified by a traveling wave tube amplifier (TWTA) or a solid state power amplifier (SSPA).

Frequency equalization and negative-slope compensation are incorporated into block 339 of FIG. 3. One of the features of the transcoder device 330 is to equalize the frequency and create a negative image of the loss generated from the conversion, and superimpose it into an equalizer to maintain constant loss over the band. A negative slope compensation technique can be a purely passive resistor network-based technique that can be implemented in the RF chain; the equalization can be hardware-based, software-based, or a combination of both.

Another module/component shown in FIG. 3 is directed towards three-dimensional (3D) doppler shifting/correction/compensation, wherein the Doppler effect (also known as Doppler shift) is the change in the frequency of a wave from the perspective of an observer when the source of the wave and the observer are moving relative to one other. Doppler manipulation (block 340) compensates for the movement as the satellite flies overhead. To this end, the doppler manipulation 340 adjusts based on tracking the changing x-y-z dimensions of the satellite (and the observer RIS, if moving, such as in a vehicle or drone). In this way, for example, the L1-PHY transcoder device 330 can deliver hardware-based doppler-modification data to allow commercially available 5G NR modems (UEs) to communicate better with satcom satellites without any UE modifications.

To summarize, FIGS. 3 and 4 are directed to 5G NR-enabled device uplink transmission, from left-to-right, and satellite downlink transmission, from right to left. The 5G NR-enabled device 332 (e.g., a notebook or smartphone) transmits an RF uplink signal, e.g., using a commercially available 5G NR-enabled components and antenna, e.g., integrated into the device. The RF uplink signal is fed into the L1-PHY transcoder box 335 for processing, and in this particular example, to the 5G NR RF front end component 443, or sent to the Mux 447 via the bypass path.

For Satcom conversion, the 5G NR RF front end component 441 thus receives the RF uplink signal from the user equipment 332 and processes the signal. The front-end handling can include initial filtering, amplification, and/or frequency conversion used for further processing. For decoding to the packet level, the processed RF signal is decoded down to the packet level using 5G NR logic blocks. This can include equalization, demodulation and/or forward-error-correction decoding to extract the data packets from the RF signal. Packet-level transcoding operates via packet conversion, in which the decoded 5G NR packets are converted to Satcom packets. This ensures that the data can be accurately and efficiently transmitted over the satellite communication uplink. In one example implementation, Satcom encoding is based on reencoding the packets using Digital Video Broadcasting (DVB)-compliant Satcom layer-1 protocols. This involves preparing the data for transmission over satellite networks, which can include modulation and forward-error-correction encoding tailored to the DVB Satcom requirements.

The encoded signal is passed through the Satcom RF front end, where it is prepared for RF output/transmission. This can include initial filtering, amplification, and/or frequency conversion to match the satellite uplink requirements. The RF uplink output is then transmitted via the uplink Mux 447 (when selected for conversion) through the RIS component(s) 450 to the NTN satellite 334.

It should be noted that the control signal or the like can also be used to fully bypass the transcoder conversion and thus save compute and power resources. Thus, although the uplink paths in FIG. 4 that are input to the Mux 457 are shown as operating in parallel, this is only one example implementation.

The downlink (receive/RF downlink in) process with respect to reception by the 5G NR-enabled device 332 of the NTN satellite downlink communication signal is shown in the opposite direction in FIG. 4. In general, The NTN satellite 334 transmits an RF downlink (DL) signal, which is received by the RIS component(s) 450. In turn, the RIS component(s) 450 forwards the received signal to the transcoder device with bypass 335 (FIG. 3), and in this example, to the Satcom RF front end component 453 and a D2D 5G NR RF bypass path. Again, while this is shown in parallel in FIG. 4, there can be a selection of one downlink path or the other.

When Satcom-to 5G conversion is needed, the RF downlink signal, which enters the Satcom RF front-end component 453, initially processes the downlink signal, which can include filtering and amplification. The processed RF signal is then decoded (block 454) down to the packet level using DVB logic blocks. This can include equalization, demodulation and forward-error-correction decoding to extract the data packets from the RF signal.

Packet-level transcoding of the downlink signal also operates via packet conversion, that is, the decoded Satcom packets are converted to 5G NR packets. This ensures the data can be accurately and efficiently transmitted over the 5G NR communication link. In general, as shown in FIG. 4, the decoded downlink packets are reencoded (block 455) using 5G NR specific L1-PHY protocols. This involves preparing the data for transmission over the 5G NR network, which can include modulation and forward-error-correction tailored to 5G NR requirements.

The reencoded downlink signal is passed through the 5G NR RF front end component 456, where it is prepared for transmission back to the user equipment 332. This can include filtering, amplification, and/or frequency conversion to match the terrestrial 5G NR downlink requirements. The prepared 5G NR RF downlink output signal is then transmitted, via a downlink Mux 447 (when conversion is selected) back to the user equipment 332 (e.g., a notebook or smartphone).

As with uplink, a downlink (DL) bypass path is also available for D2D 5G NR, e.g., as represented by the downlink input signal being coupled to the other input of the downlink Mux 447 component (block 456). This path can handle any needed frequency conversion, including that the D2D 5G NR bypass path may convert to a different frequency than the original "Satcom-to-5G NR" pipeline. For example, an optional frequency converter in the downlink bypass path (not explicitly shown) may be invoked for situations where the user equipment does not support the 5G NR satellite frequency band(s).

As described herein, the dual-band device includes the downlink multiplexer (DL Mux) 457 that facilitates selecting between which path to take to transmit to the user equipment, namely the transcoder/conversion state for Satcom, or the D2D state 5F NR. A control signal CTL[0] as described herein determines which state is selected. FIG. 4 also shows that the output of the 2X1 Mux 457 is transmitted to the user equipment 332.

In one implementation, the downlink multiplexer 457 is a 2X1 Mux that selects between the downlink "Satcom" pipeline path or the "D2D 5G NR" path. The downlink multiplexer 457 can be a dumb hardware Mux, physically selecting the downlink path, e.g., with no dynamically switching Mux features. Again, for downlink bypass, the entire downlink Satcom conversion path can be bypassed rather than processed in parallel as in FIG. 4.

Turning to controlling the uplink and downlink multiplexer states, in one or more example implementations, the edge compute device 341 runs a number of software modules, including trained models 342. Example trained models 342 include, but are not limited to an AI/software control and switching engine 462, and an AI/software RIS (metasurface) control software engine 463. Although not explicitly shown, the edge compute device 341 can track the satellites' positions, e.g., via an AI/software satellite tracking engine.

In general, the AI/software control and switching engine 462 performs intelligent, dynamic multiplexer control, that is, the AI/software control and switching engine 462 configures the uplink and downlink 2X1 Muxes 447 and 457 (FIG. 4). The AI/software control and switching engine 462 can "circuit-switch" between the Satcom and D2D 5G NR transmit and receive paths, including supporting interleaving of the Satcom and D2D 5G NR uplink and/or downlink communication links. This can be highly beneficial in deployments where the terrestrial and the satellite communication links are overloaded, broken, and/or challenged, e.g., by disaster and weather conditions.

The AI/software RIS software control engine 463 facilitates RIS configuration and programming of the RIS (metasurface). This can include selecting or reconfiguring the uplink/downlink frequencies of the RIS, as well as primary-satellite and secondary-satellite switchover. Slicing of the metasurface as described herein can also be performed by the AI/software RIS software control engine 463.

The onboard AI/software can track the satellites across the horizon. This allows the AI engines 462 and 463 to seamlessly switch between the primary satellite and the secondary satellite. Note that the handing-over from one LEO satellite to another LEO satellite is a challenging AI model resource-intensive task, and depending upon the satellite constellation, this handover can be as frequent as every twenty minutes. The seamless cutover based on the technology described herein is an appropriate solution, avoiding glitches, delays, and/or errors.

By way of example, consider that the primary satellite is close to leaving the field of view of the RIS, while the secondary satellite has entered the field of view. Satellite tracking can instruct the RIS metasurface control engine 463 to reconfigure its unit cells to redirect the signals to and from the secondary satellite, (which then becomes the new primary satellite); reconfiguration can further occur so as to facilitate use of a narrower/higher gain beam that follows the primary satellite across the horizon until the switch to the secondary satellite. As a further example, consider that the primary satellite supported D2D communications, but the secondary satellite to be switched-to supports Satcom. The AI/SW control engine 462 can change from the multiplexer bypass state to the multiplexer transcoder conversion state, in conjunction with instructing the AI/software RIS software engine 463 to change its operation for Satcom frequency redirection.

In one example implementation, described herein is leveraging AI to dynamically and more optimally control the slicing of metasurfaces integrated in non-terrestrial network transcoder nodes. This ensures efficient allocation of mesh resources, allowing different portions of the metasurface to be dedicated to specific tasks, such as mesh node connectivity or non-terrestrial network connections. This enhances overall network performance and adaptability.

Further, federated learning can be utilized to ensures that data privacy is maintained as sensitive data remains on the device. Only model updates are shared across devices, preventing exposure of raw data. This enhances trust and complies with data privacy regulations, while continually improving the AI models based on decentralized data. Still further, a multi-model approach ensures that aspects of network management are optimized simultaneously, resulting in a highly efficient and adaptable network capable of handling complex and dynamic conditions. The integration of various AI models, including based on reinforcement learning for adaptive beamforming and direction control, supervised learning for optimal band prediction, and graph neural networks for efficient mesh network management, provides a holistic and robust solution.

In one example implementation, edge computing capabilities are implemented into the transcoder box. In terms of hardware integration, one implementation shown in FIG. 3 adds a dedicated edge computing device (module) 341 to the transcoder node (device 330). The edge compute capabilities of the L1-PHY transcoder system facilitate a mesh network architecture, in which the system can be scalable, allowing for additional edge nodes to be integrated as needed.

Figure 5:
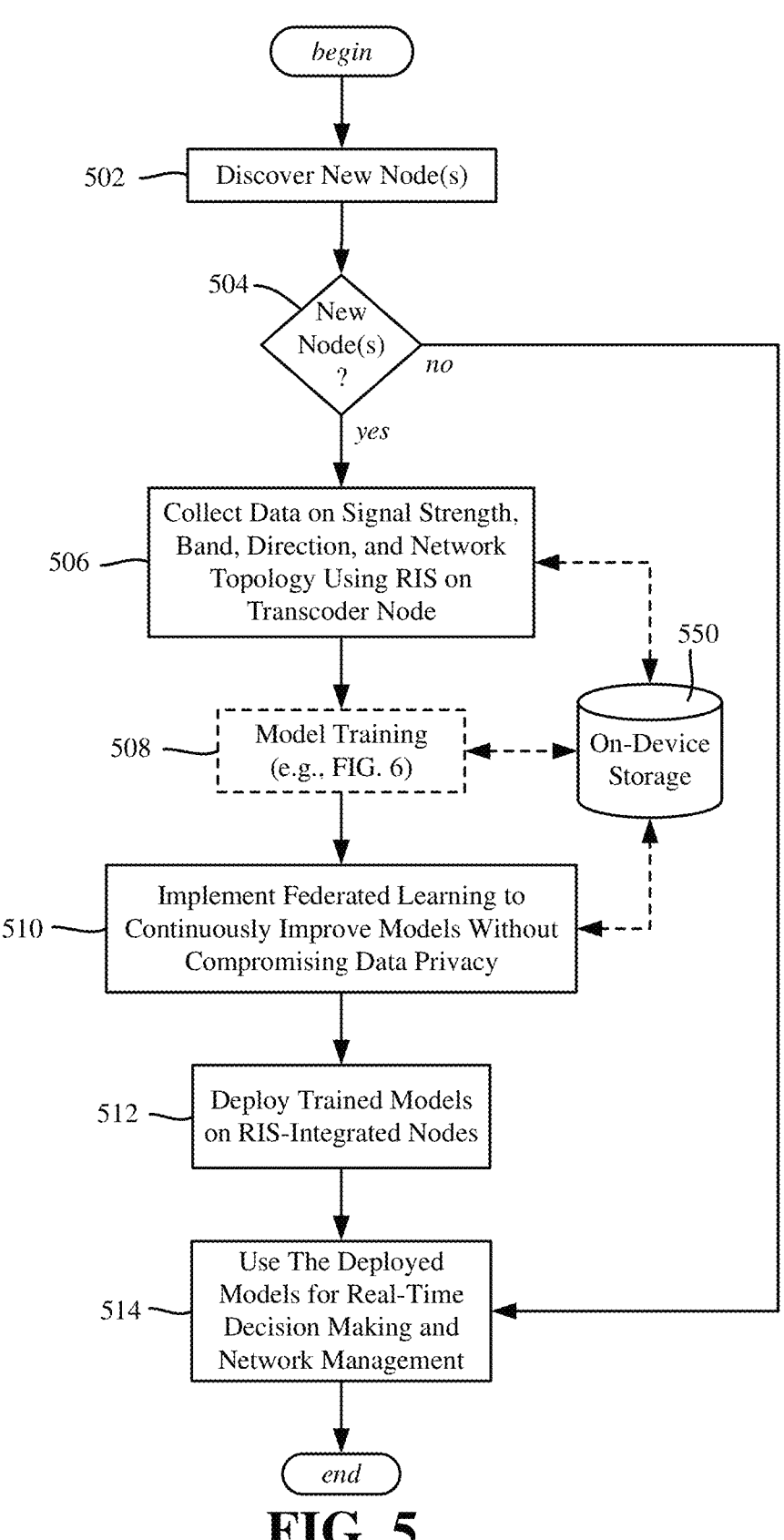
FIG. 5 is a flow diagram representing example operations related to a workflow when adding a new transcoder node to a mesh network of transcoder nodes, in accordance with various example embodiments and implementations of the subject disclosure.

FIG. 5 is a flow diagram showing how the mesh network can be modified as one or more new nodes are discovered, as represented via example operations 502 and 504. Example operation 506 represents data collection, which can involve gathering a comprehensive set of indoor environmental data, sensor inputs, and historical network performance data. Indoor data can, for example, include information on signal strength, interference levels, and physical obstructions, while sensor inputs capture real-time conditions from the metasurfaces and surrounding indoor data. Historical data helps in identifying patterns and trends that can inform model training. This collected data is used for understanding the various factors that influence network performance. Note that in FIG. 5 (and FIG. 6), on-device storage 550 can be used by the various operations, including training-related operations, as described herein.

After collecting the necessary data at operation 506, the signal strength between devices and the metasurface can be determined. This ensures accurate slicing of the metasurfaces, optimizing their performance. By measuring the signal strength, the system can precisely configure the metasurfaces to achieve optimal beamforming and directionality, which is appropriate for effective network management.

Figure 6:
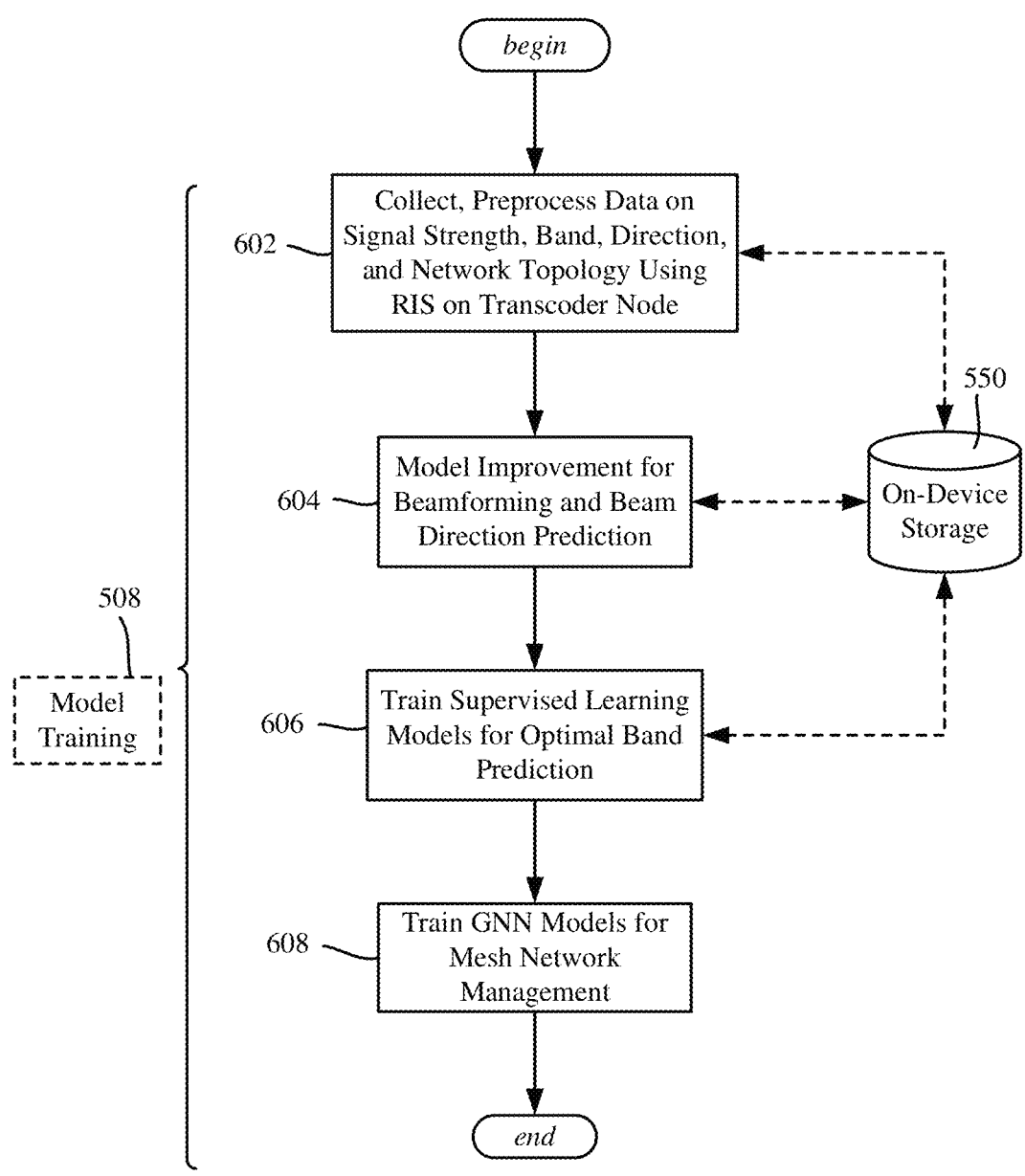
FIG. 6 is a flow diagram representing example operations related to a model training workflow, in accordance with various example embodiments and implementations of the subject disclosure.

The workflow then moves to model training (operation 508) as shown in more detail FIG. 6, which involves several sub-tasks, including that the collected data is preprocessed (operation 602) to ensure it is clean and free of inconsistencies. Reinforcement learning models such as deep Q-networks (DQN) or proximal policy optimization (PPO) can be trained to dynamically adjust beamforming and direction settings (example operation 604) based on real-time interactions with the environment. Additionally, supervised learning models like convolutional neural networks (CNN) or gradient boosting machines (GBM) can be trained to predict the optimal frequency bands based on input features (example operation 606). Graph neural networks (GCN) or graph attention networks (GAT) can be utilized to manage and optimize the mesh network topology, ensuring efficient communication paths between nodes (example operation 606).

To maintain data privacy, federated learning is implemented, as represented by operation 510 of FIG. 5. In this approach, model updates from multiple devices are aggregated without sharing raw data. Federated learning ensures that sensitive data remains on the device, while still allowing for continuous model improvement. The federated learning process involves model aggregation and privacy preservation techniques such as federated averaging.

Following federated learning, the trained models are optimized for deployment on edge devices. This involves converting and fine-tuning the models for efficient on-device execution using frameworks such as TensorFlow Lite, PyTorch Mobile, or ONNX Runtime. These frameworks are designed to provide lightweight, high-performance inference capabilities on edge devices. Once optimized, the models are deployed to the metasurface nodes, enabling real-time inference, as represented by example operation 512.

During real-time inference, the deployed models make dynamic adjustments to beamforming, direction, and frequency band selection based on real-time data, as generally represented by example operation 512. The inference engine continuously manages the network, adapting to current conditions to ensure optimal performance. This real-time management is useful for maintaining high-quality network connectivity and performance.

The technology described herein is based on metasurface slicing, that is, subdividing a metasurface/RIS into different portions to perform different communication roles, which can be dynamically controlled by AI. The AI models adjust the slicing of the metasurfaces to allocate portions for different purposes. Smaller slices can be dedicated to interconnecting various mesh nodes within the network, for example, while a larger slice can be used to maintain a robust connection with a non-terrestrial network.

The technology can include a phase of (e.g., continuous) learning and improvement. A feedback loop can be established in which data collected from network performance and user feedback is used to update and retrain the models periodically. Such learning and improvement ensures that the system remains adaptive and efficient over time, improving based on new data and changing network conditions.

To summarize some of the implementation options, including for development and deployment, dynamic metasurfaces are used for beamforming and direction control. An edge device can be deployed within the transcoder device/node (box structure) with sufficient computational power to run on-device AI models (e.g., Raspberry Pi, Nvidia Jetson, or similar edge computing hardware). Note that such AI models need less than 10W of computational power, as the models are extremely lightweight in terms of compute requirement and only need to be activated when new nodes are discovered. Hardware also includes the sensors for collecting environmental data, signal strength, and other relevant metrics, along with the L1-PHY transcoder hardware for establishing and maintaining connections with the non-terrestrial network.

Software can include machine learning frameworks such as, for example, TensorFlow Lite for deploying lightweight ML models on edge devices, PyTorch Mobile for running PyTorch models on mobile and edge devices, and/or ONNX Runtime for high-performance scoring of machine learning models. Example federated learning frameworks can include TensorFlow Federated for implementing federated learning.

Data processing and analysis can, for example, be based on NumPy for numerical computations, Pandas for data manipulation and analysis, and SciPy for advanced mathematical and statistical computations. Example reinforcement learning libraries can include Stable Baselines3 for reinforcement learning algorithms like DQN and PPO, and OpenAI Gym for creating and simulating reinforcement learning environments. Example graph neural network libraries can include DGL (deep graph library) for building and training graph neural networks and PyTorch Geometric for implementing graph neural networks.

Example model optimization tools can include Tensor-Flow model optimization toolkit for model quantization and pruning, and NVIDIA TensorRT for optimizing inference performance on NVIDIA hardware. Development and deployment tools can include Docker for containerizing applications and ensuring consistent deployment, and Kubernetes for managing containerized applications in a clustered environment.

Example edge device management platforms can include Balena or EdgeX Foundry for managing and deploying applications on edge devices. Example networking and communication can be based on MQTT for lightweight messaging and communication between devices. Websockets can be used for real-time communication between the devices and the primary node, for example.

Example network management tools can include Ansible for automating the deployment and management of network configurations, and Open Network Automation Platform (ONAP) for orchestrating and automating network services. Security and privacy can use data encryption libraries such as PyCryptodome for implementing encryption and decryption of sensitive data. Example federated learning security tools can include OpenMined PySyft for secure and privacy-preserving machine learning.

Figure 7:
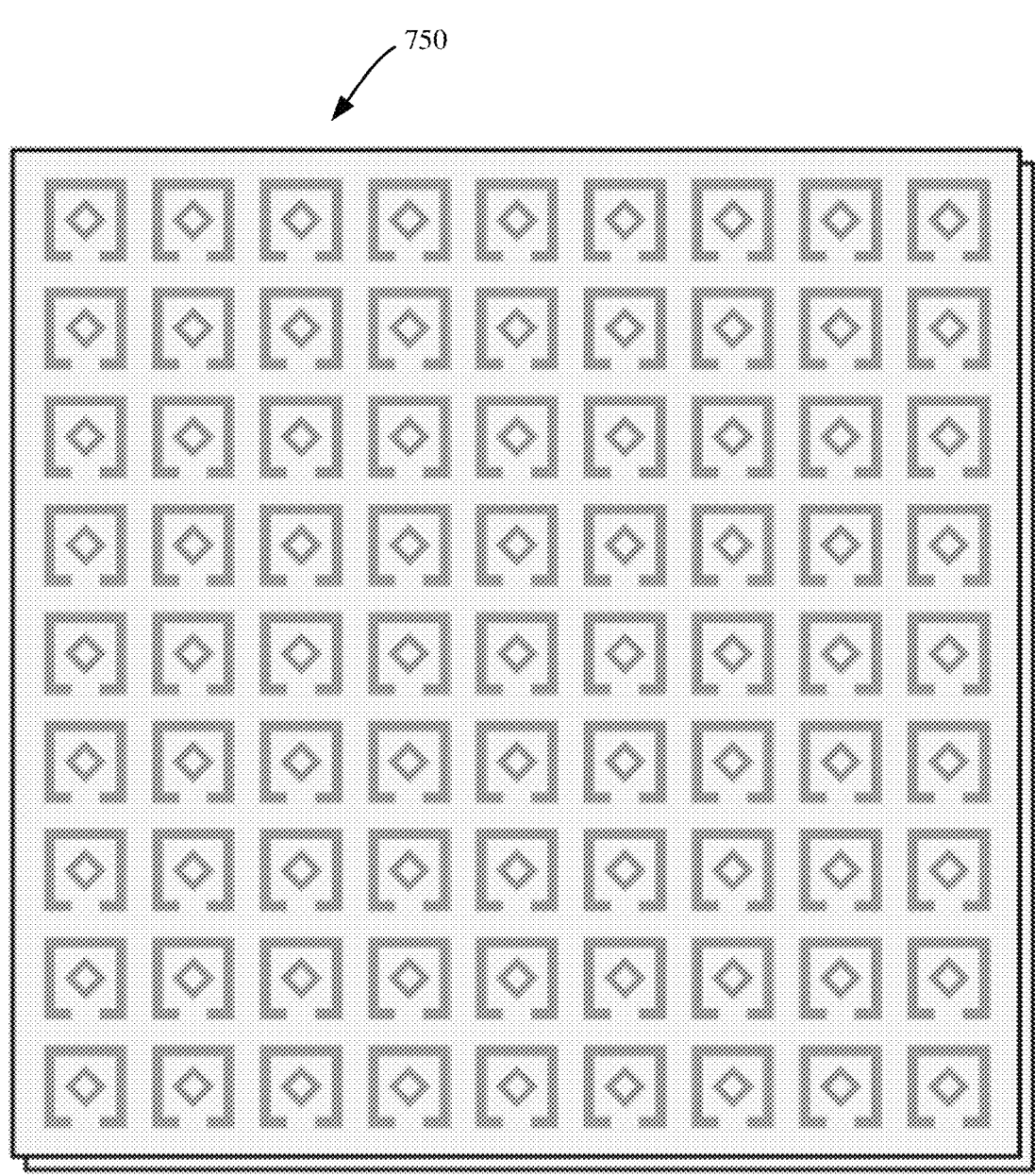
FIG. 7 is an example top view representation of an example metasurface panel that can be configured to operate in a transmission mode or a reflection mode, in accordance with various example embodiments and implementations of the subject disclosure.

Turning to addition details of the metasurface (RIS), FIG. 7 shows the concept of a metasurface 750 of unit cells. Although not explicitly represented in FIG. 7, one such metasurface can be portable, and can have a metal back plane (e.g., a solid metal sheet) selectively (e.g., manually) attached for reflection mode (R-mode) or detached, whereby the panel works in transmission mode (T-mode). Thus, in one implementation, a complete panel (which can be portable) can include two physical sections; one section is the array of metasurface unit cells (FIG. 8) patterned on a metal layer formed on the dielectric substrate, while the second is a detachable/attachable solid metal sheet that functions as a back plane. When the metal panel is attached to the back of the metasurface array, the metasurface 750 inherently operates in the reflection mode, bouncing the enhanced signals back in the reflecting direction, allowing signals to be reflected from the panel with improved signal strength due to array gain from constructive interference, resulting from different configured phase shifts of the unit cells. When the metasurface is used without the back plane, it operates in a transmission mode, allowing signals to pass through the panel with improved signal strength due to array gain from constructive interference, via refraction of the signal. In one design implementation, a magnetic attachment system can be used to couple the back plane to the underside of the unit cell surface, which simplifies the alignment when transitioning between transmissive and reflective operating modes. By simply placing or removing the back plane, a user can switch the metasurface between its two modes of operation, making the system highly adaptable for different communication scenarios.

In one or more example implementations, a passive portable metasurface can be manually configured to operate either in reflection mode (R-Mode) or in transmission mode (T-mode) to service various device(s)/UE(s). Such portable metasurfaces can be designed in a way to offer signal boost in the 3GPP standardized non-terrestrial network bands without requiring any power source, providing indoor usage scenarios as well as a travel-ready solution for remote areas, and/or during emergency situations when power is not available. It should be noted that while such an inexpensive back plane option allows straightforward reconfiguration of the operating modes of a metasurface, this is a non-limiting example. For example, one user may want a ceiling-mounted metasurface for operating only in the transmission mode, and can thus purchase one without a back plane. In contrast, a different user may want a window-mounted backplane for operating only in the reflection mode, and can purchase a metasurface with a fixed (non-detachable) back plane for presumably less cost than a metasurface with a selectively detachable back plane.

Figure 8:
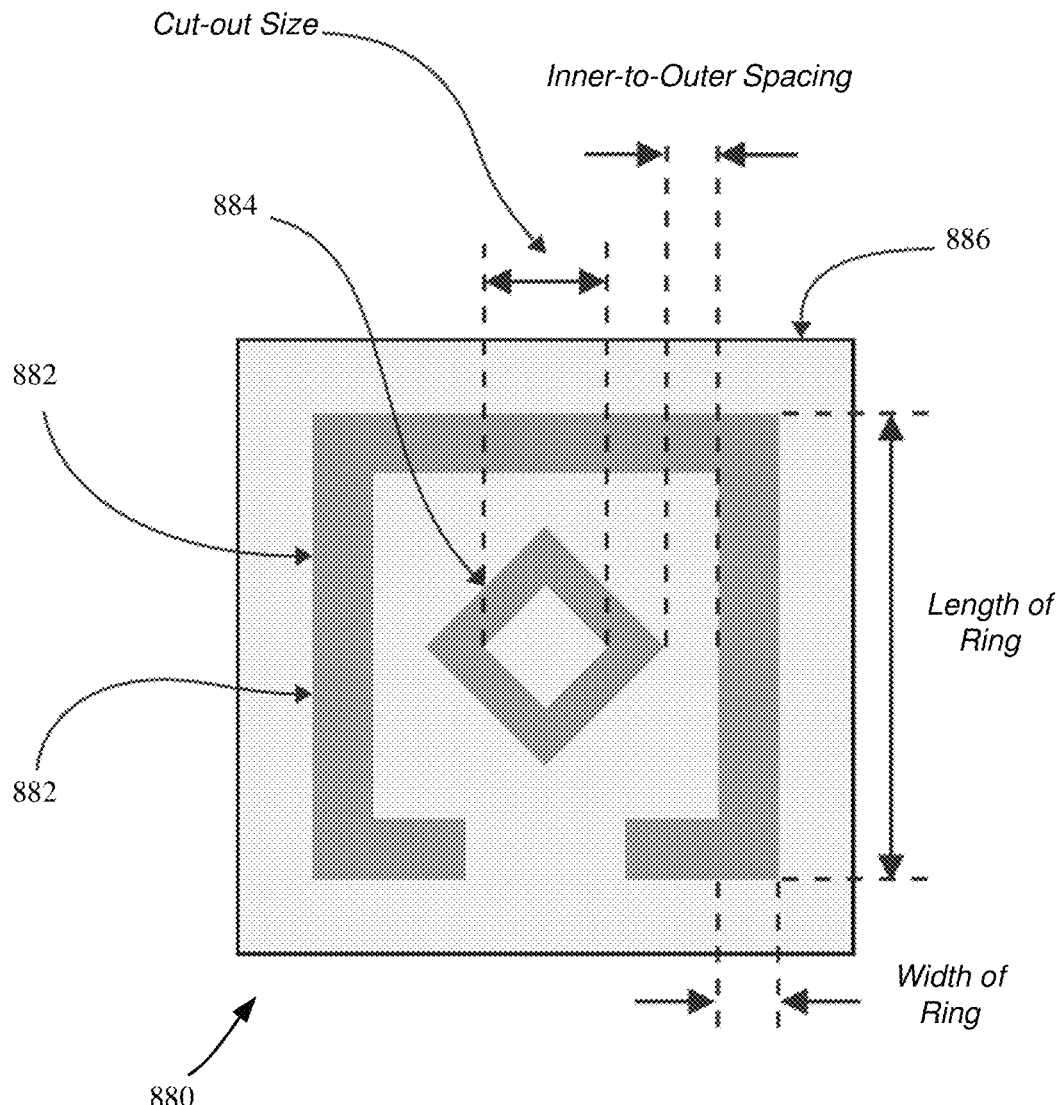
FIG. 8 is an example top view representation of an example unit-cell suitable for use in a metasurface that operates in a transmission mode or a reflection mode, in accordance with various example embodiments and implementations of the subject disclosure.

FIG. 8 shows one example design of a unit cell 880 of a metasurface. In this example, the unit cell 880 has a metallic resonating pattern shaped as square split ring (outer shape 882) with a central rhombus (inner shape 884). The pattern is formed from a thin metal film on a dielectric substrate 886. The dimensions of the unit cell 880 determine the frequency at which the unit cell resonates, and are thus sized based on the frequency band of the incoming signal, e.g., the n255 or n256 satellite bands. Smaller dimensions can be used for higher frequencies, such as millimeter wave/FR2 frequencies. Note that FIG. 8 is only one non-limiting example, and that the metallic resonator pattern of a unit cell can be of any shape and size as long as the metallic resonator pattern resonates at the desired frequency.

Scaling of the rhombus shape, or by rotating the inner shape 884, allows the phase of the unit-cell to be tweaked; in this way, a metasurface's unit cells can be coded as per the phase-codebook of the metasurfaces for beam redirection, given an incoming signal from a known general direction relative to the metasurface, e.g., from the sky for a satellite. Various design dimensions are shown in FIG. 8 to better illustrate the optimization variables. This shape of the unit-cell can be developed on any choice of commonly available dielectrics including but not limited to FR4 laminates, Rogers RF substrates, alumina, sapphire, glass, ceramics, or other non-metallic substrates, as long as the unit-cell shows a resonance peak at the desired frequency.

Figure 9:
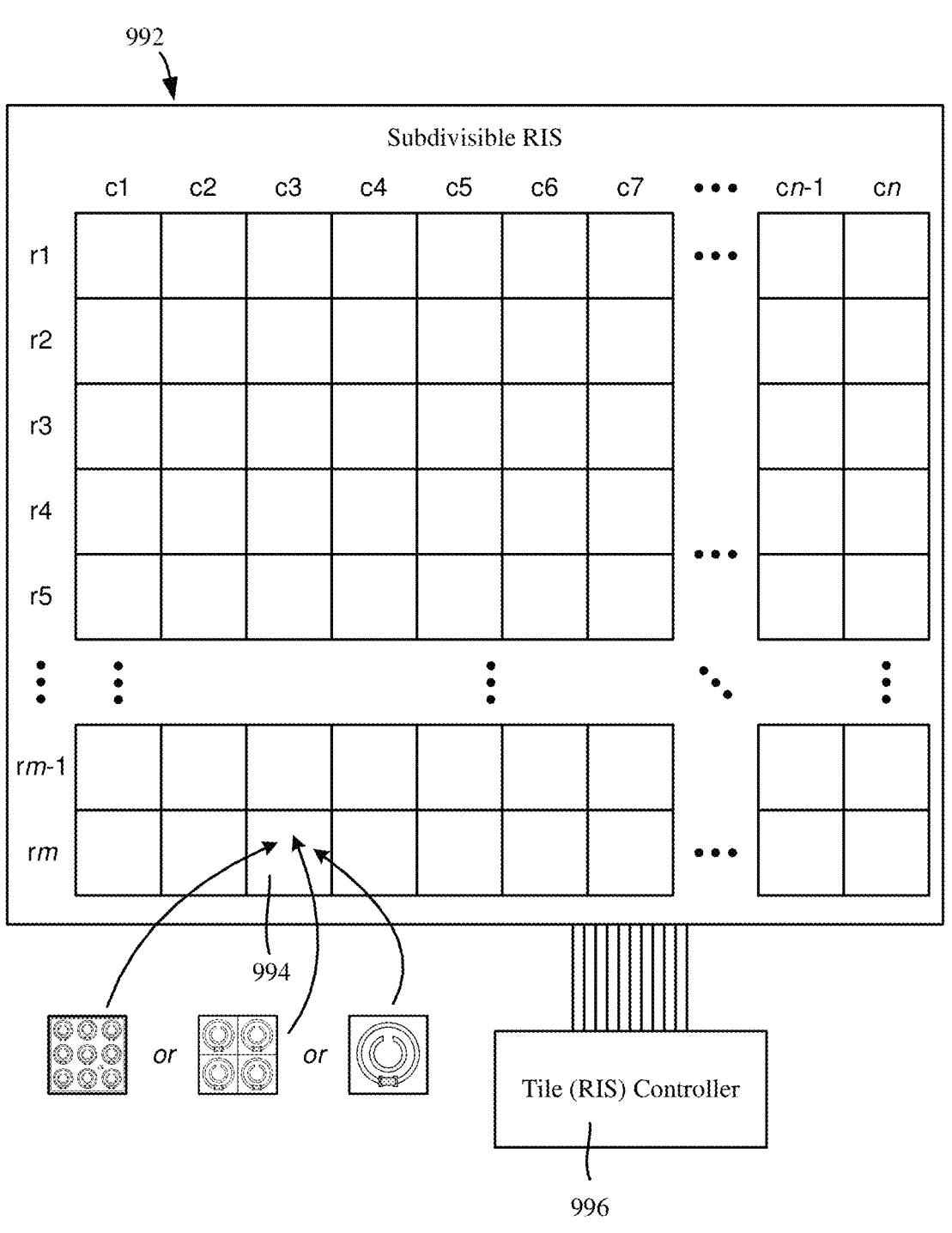
FIG. 9 is a top view representation of an example reconfigurable intelligent surface (RIS) capable of being divided by a RIS controller into portions of subarrays of unit cell groupings, in accordance with various example embodiments and implementations of the subject disclosure.

As shown in FIG. 9, in general, a generalized reconfigurable intelligent surface panel or simply a reconfigurable intelligent surface 992 includes a certain number of elements or unit cells (represented as squares) distributed in rows (r1, r2, r3, . . . , rm-2, rm-1, rm) and columns (c1, c2, c3, . . . , cn-2, cn-1, cn). Note that the squares can represent of j×k unit cell groupings distributed in the rows (r1, r2, r3, . . . , rm-2, rm-1, rm) and the columns (c1, c2, c3, . . . cn-2, cn-1, cn). One of the unit cell subarrays, or one of the individual unit cells (depending on a given RIS implementation), is labeled 994 in FIG. 9, which in this example can be a single unit cell, a 2×2 subarray of unit cells, a 3×3 subarray of unit cells, and so on. There is thus a reconfigurable intelligent surface 992 with a total size of rm×cn unit cells (or rm×cn×j×k unit cells if each square represents a j×k subarray of unit cells) depicted in FIG. 2, controlled by at least one tile (RIS) controller 996. For purposes of brevity, and because a j×k subarray of unit cells can represent a single unit cell (j=1 and k=1), the portions (i.e., slices) of the reconfigurable intelligent surface are described hereinafter as being composed of subarrays; each such portion includes at least one subarray.

In general, a reconfigurable intelligent surface has a beamforming gain=20 log (number of unit cells); the reconfigurable intelligent surface receiver gain or transmitter gain is thus proportional to the number of unit cells used/activated for a receiver and/or a transmitter in a wireless link. For a given reconfigurable intelligent surface panel, the number of unit-cell(s) used/activated for a base station-reconfigurable intelligent surface link and reconfigurable intelligent surface-UE link can be informed by the base station or the UE to improve weaker coverage between the base station-reconfigurable intelligent surface link and/or the reconfigurable intelligent surface-UE link. For example, when the base station knows that the base station-to-reconfigurable intelligent surface link is a weaker coverage link between the base station-reconfigurable intelligent surface link and the reconfigurable intelligent surface-UE link, e.g., based on reported measurement results from the reconfigurable intelligent surface, the base station can inform the reconfigurable intelligent surface to use a greater number of unit cells for the base station-reconfigurable intelligent surface link, and use a lesser number of unit cells for reconfigurable intelligent surface-UE link, as per a straightforward computation of unit cells.

Figure 10:
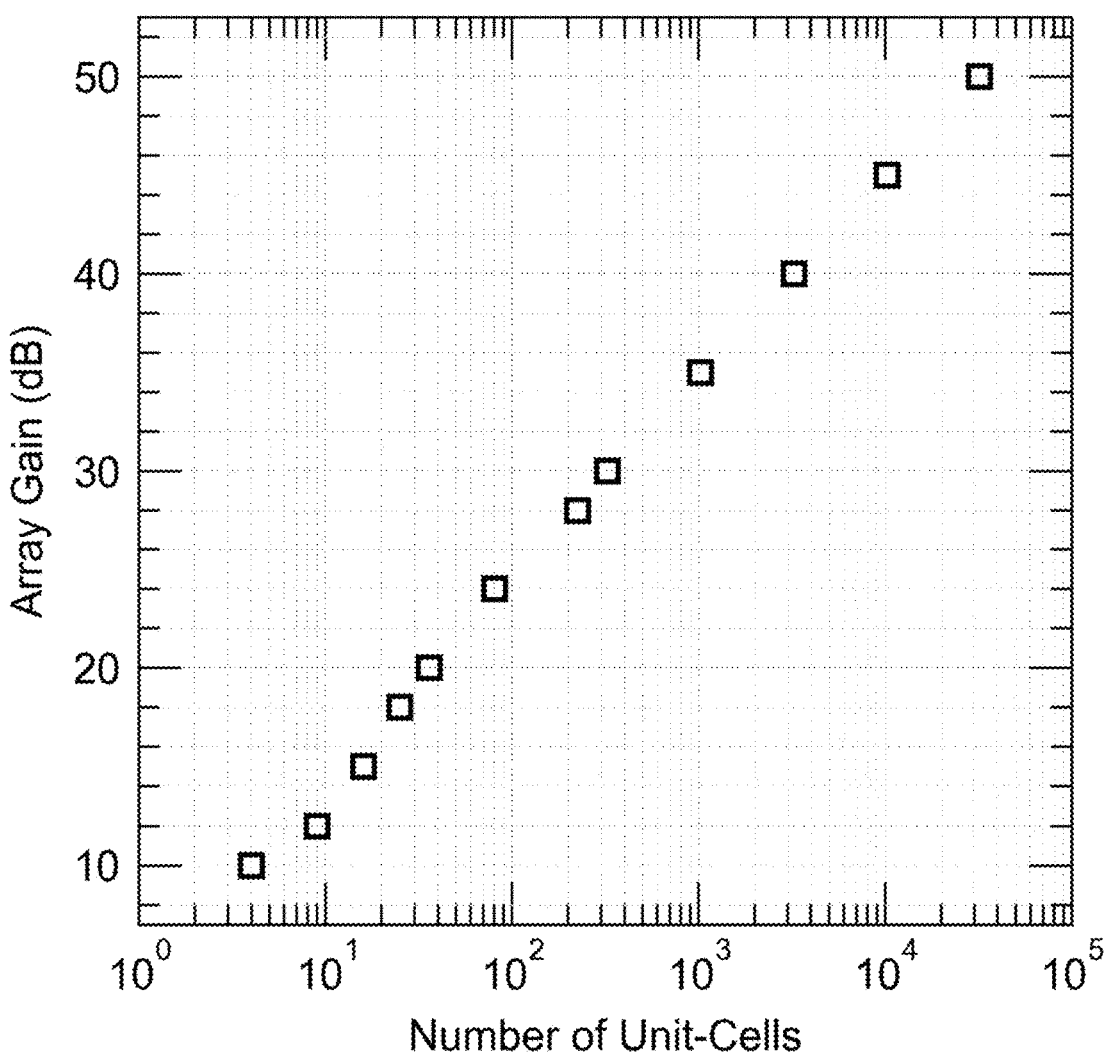
FIG. 10 is an example graphical representation of a total number of unit cells of a RIS needed to achieve specific array gain, in accordance with various example embodiments and implementations of the subject disclosure.

Because as described herein the information about the total number of available subarrays and dimensions of unit cells is given to (or previously known to) the base station, the control link can optimize the ratio or slicing of the reconfigurable intelligent surface appropriately, as the array gain is independent of the frequency, and depends only on the number of unit cells used. For example, FIG. 10 shows the total number of unit-cells (note that the x-axis is plotted using a log scale) needed to achieve a specific array gain, in dB, which is independent of the frequency of operation. As can be readily appreciated, the gain based on the total number of unit cells can be for an entire RIS, or for a smaller allocated portion of unit cell subarray(s). Note that once a reconfigurable intelligent surface is deployed, the size of reconfigurable intelligent surface panel is fixed; in other words, the maximum number of unit-cell/reconfigurable intelligent surface elements in the reconfigurable intelligent surface panel are fixed, which can be known in advance to the base station. If not known or varied for some reason (e.g., some unit cells are detected as bad) the RIS can report the total number of unit cells/RIS elements to a BS as a capability of the RIS. Alternatively, or in addition to the total number of unit cells, for a RIS composed of subarrays, the RIS can report the total number of subarrays, and if needed/not known to the base station, the size (e.g., 3×3, or nine) of the subarrays.

As described herein, a reconfigurable intelligent surface may be introduced into a communications system because the direct link between the base station and UE, also called a base station-UE link, may be obstructed sufficiently or even completely due to blockage, and/or because the base station-UE link is a weak communication link due to a highly fading propagation environment and cannot be utilized (such as corresponding to a low RSSI (received signal strength indicator) or SINR (signal-to-interference-plus-noise ratio)). A reconfigurable intelligent surface may be introduced into the wireless system to add one more fading paths for the UE to improve spectral efficiency, even when a direct base station-UE link is present.

Any individual link can have the weakest coverage relative to other links, or a dynamically varying coverage "hole" issue, which depends on a real time varying environment. One implementation can fully utilize the reconfigurable intelligent surface for dynamic gain allocation, or alternatively as described herein, can allocate a certain number of unit cell subarrays or a ratio of used/unused subarrays for a specific link. Thus, in another alternative way, the control signal can include the ratio of number of unit-cells/RIS elements/subarrays; for example, for receive-and-forward A, receive-and-forward B, transmitter C, receiver D, the ratio of the number of unit-cells/RIS elements/subarrays can be specified as 4:2:1:1, with the ratio values changed as deemed appropriate as environmental conditions change, for example.

Figure 11:
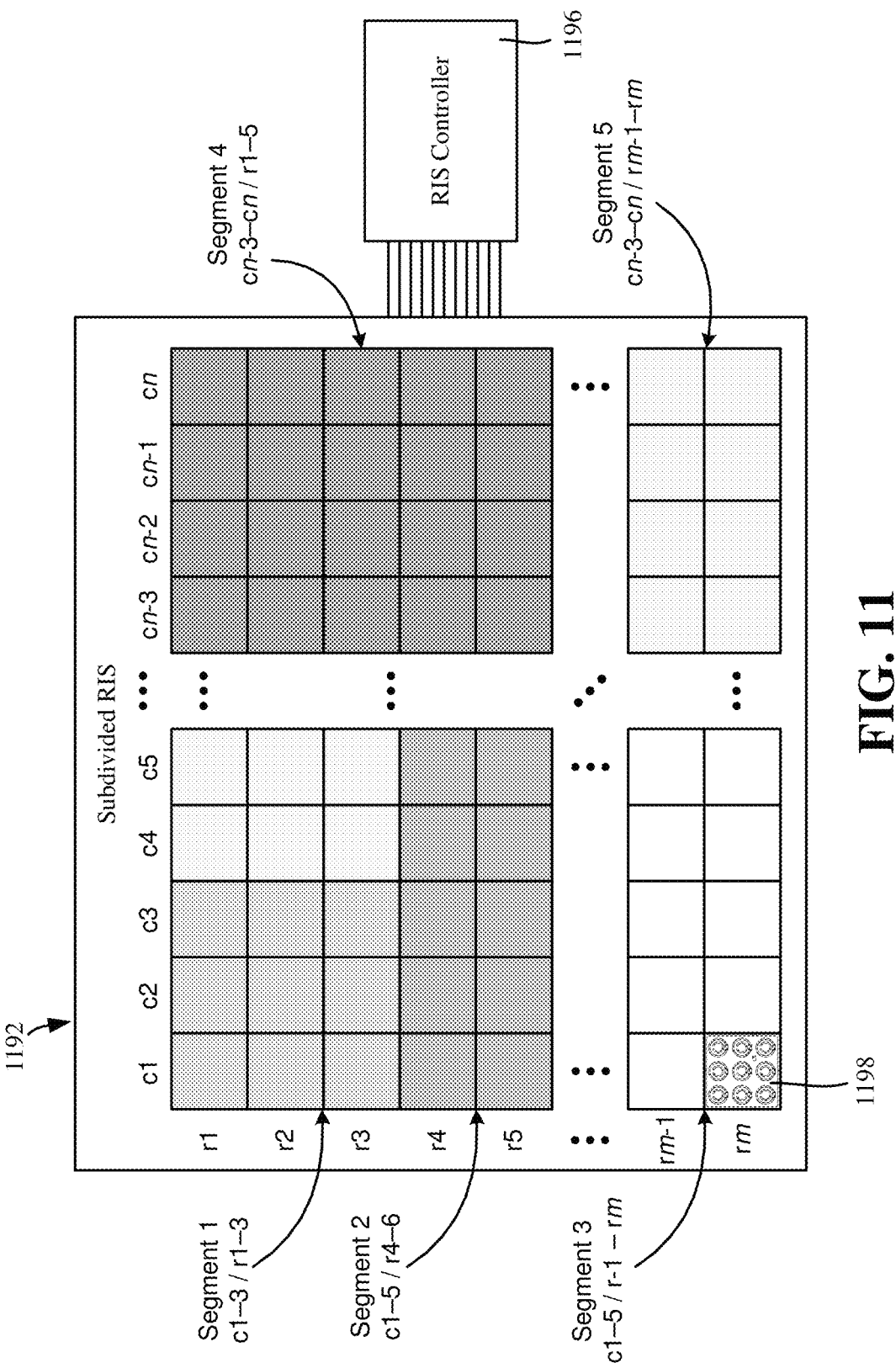
FIG. 11 is a top view representation of an example RIS highlighted with various distributed portions (segment) composed of smaller subarrays of unit cells, in which each portion can have a separate directivity and/or array gain, in accordance with various example embodiments and implementations of the subject disclosure.

One example distribution or slicing of a subdivided reconfigurable intelligent surface panel to achieve dynamic array gain is shown in FIG. 11, where portions can be formed in the subdivided reconfigurable intelligent surface 1192, with each portion including a certain number of subarrays of unit cells (column-wise and/or row-wise). One of the cells (possibly subarrays) is labeled 1198 in FIG. 11, and while a 3×3 subarray is shown in this example, any j×k subarray can be used, where to reiterate, j>=1, k>=1, and typically j=k. The various portions in FIG. 11 of the reconfigurable intelligent surface highlight the distribution of the smaller subarrays of unit cells, in which each portion can have a separate directivity and/or array gain.

If only a single transcoder box is used, all of the unit-cells can be used towards the link between NTN network and UEs. Any addition to the network mesh (if a user adds one or more nodes), one of the transcoder nodes can serve as a primary node and the rest can all be secondary nodes. The primary node controls the slicing distribution for on-device data control and processing; input from the secondary nodes, such as the number of unit cells needed for adequate communication with the satellite, can be considered by the primary node when subdividing the metasurfaces. Similarly, to fully utilize the panel, various dynamic segments can be formed by the RIS controller after receiving instructions from the BS (NTN connection), or from any child node for any weak wireless link.

As shown in FIG. 11, a portion "Segment 1" is formed using subarrays c1-3 and r1-3, totaling nine unit cells or subarrays (81 total unit cells in a 3×3 unit cells-per-subarray example), while a separate portion "Segment 2" is formed using subarrays c4-5 and r1-3, totaling 6 subarrays (54 total unit cells in a 3×3 unit cells-per-subarray example). Similarly, to fully utilize the panel, various dynamic portions can be formed by the reconfigurable intelligent surface controller 1196 after receiving instructions from the base station, e.g., for any weaker wireless link. In this way, the total number of subarrays in a portion can be used as a performance indicator, or the ratio of the panel can also be used for such. For example, if a reconfigurable intelligent surface 1192 has one-hundred total subarrays, and no allocation has been done, then the first Segment 1 portion can be formed anywhere between four percent (4%) up to the 100% of the available unused subarrays; thus the ratio of the Segment 1 portion to the size of the panel can be allocated as anywhere between 4:100 to 100:100. If the Segment 1 portion only needs a certain array gain, such as corresponding to 10% of the panel, then 90% of the panel's subarrays are still unused and can be used towards forming other portions.

In general, non-terrestrial network airborne networks may be intra-continent, or span across oceans and multiple continents, as a non-terrestrial network is a global network. By way of example, consider the travels/life of a data packet in a system-level end-to-end network as generally represented in FIG. 12, in which acronyms include inter-satellite link (ISL), low earth orbit (LEO) and high-altitude platform systems (HAPS).

Figure 12:
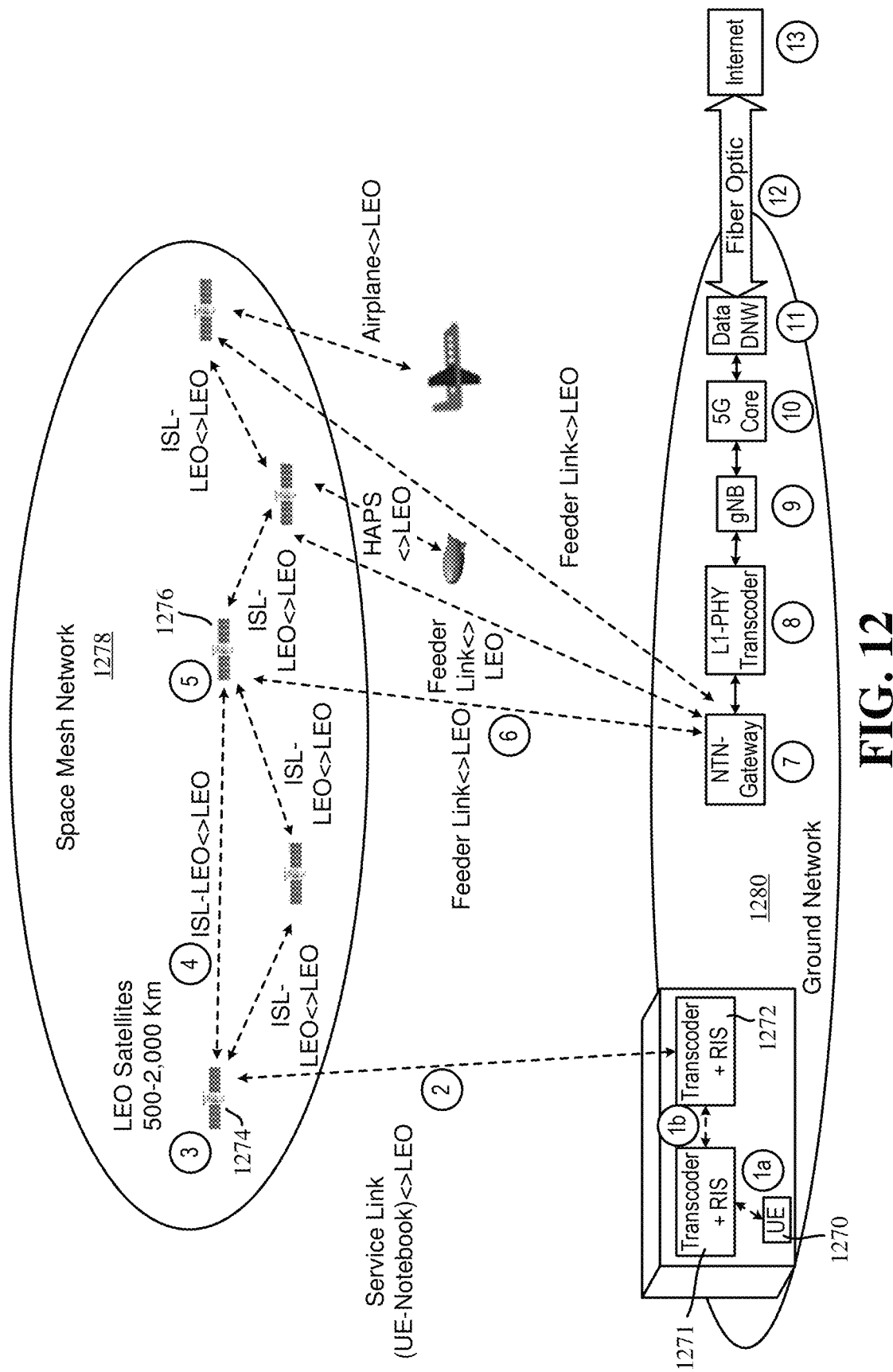
FIG. 12 is a representation of an example system-level end-to-end network showing how a data packet is communicated from an indoor notebook, via a metasurface, to and from a space mesh network, in accordance with various example embodiments and implementations of the subject disclosure.

The example of FIG. 12 shows a non-terrestrial network direct-to-device end-to-end deployment of a UE (notebook computer) and provides a life-of-a-packet description, in which circled numerals represent communications (alpha-numerically labeled arrows) and components/component operations (numerically labeled blocks). Analysis of the packet starts inside a building, such as an office, e.g., on the East coast of the United States, in which a UE 1270 is shielded by a roof, walls, windows, and/or doors, whereby a metasurface to the satellite is needed.

Labeled arrow (la) represents packets leaving the UE 1270. In this example, consider that the transcoder (with RIS) 1271 with which the UE 1270 is communicating is not coupled to a satellite, (e.g., the satellite 1274 is out of its field of view), however the transcoder (with RIS) 1272 is coupled to the satellite 1274, and the transcoders 1271 and 1272 are part of a mesh network as described herein. Thus, the UE 1270 is able to communicate via the transcoder 1271 to the transcoder 1272, because part each transcoder RIS is sliced for mesh network communications. Arrow (lb) represents the packets, transcoded to Satcom or bypassed to 5G NR, being reflected out of the interior of the building using the transcoder with metasurface panel technology 1272 as described herein.

Arrow (2) represents the packets traveling through the satellite air interface to a first LEO satellite 1274 using the service-link. Once inside the satellite (labeled block (3)), the Satcom (converted from 5G NR) channel packet or 5G NR channel packet is repeated (amplified/frequency-converted).

At arrow (4), the Satcom or 5G packet leaves the first LEO satellite 1274 through the space mesh network 1278 using the "Optical Inter-Satellite Arrow Links (ISL)", more specifically the "ISL-LEO-LEO" link. The space mesh network 1278 is basically a router/switch in space, represented by arrow (4) passing the packets through the space network; (note that multiple space network hops are possible, both LEO and GEO (geostationary earth orbit) satellite hops). The satellite physical interface is the inter-satellite links (ISL), similar to the optical interfaces used in ground networks.

Once the Satcom or 5G packet gets close to its destination, in this example it is in the western part of the United States, the packet terminates (labeled block (5)) inside the second LEO satellite 1276. As represented by arrow (6), the Satcom/5G packet is then exported out of the second LEO satellite 1276 through the radio-frequency (RF) feeder-link downlink connection. Thus, as represented by block (7), the packets pass through the non-terrestrial network gateway, and if Satcom are converted back to 5G packet data at block (8), then at block (9) through the gNodeB (gNB 5G Radio Access Network), and at block (10) to the 5G Core (5 GC). As represented by block (11), via the standard data network, the data network block is the transcoder-block from the mobile-network to standard ground data network. The 5G NR tunneled packet is demodulated back to the original baseband packet format and processed into the data network as a typical Internet Protocol (IP) packet, thus processed through commercial-off-the-shelf routers and switches.

As represented by block (12), once the IP packet routes through the traditional fiber data network (DNW), the packet enters the Internet connection. At block (13), once the data is retrieved from the Internet, the read-return packet can be sent through the same exact ground-network 1280 and space mesh network 1278, returning the read-return packet to the notebook UE 1270.

In sum, the technology described herein facilitates a universal dual-RF front end L1-PHY transcoder device (box), which can be a low-cost, low-intelligence (hardware solution, no additional software), for straightforward configuration and operation. The L1-PHY transcoder can be separated from the RIS components to again lower-the cost/complexity. This device can be implemented as a small, light box, which can be implemented in a physical footprint/form factor as small as the size of a cellphone, for example.

In general, for Satcom communications, a packet-level transcoding methodology decodes signals down to the packet-level using 3GPP 5G NR logic blocks before re-encoding them for DVB satellite satcom communication (and vice versa), ensuring high fidelity and minimal data loss. This approach maintains the integrity of the data while allowing efficient transcoding between different communication protocols. Bypass is available for 5G-direct-to-device communications, in both uplink and downlink directions. The L1-PHY device can include additional included features, such as (but not limited) doppler shifting/correction/compensation, frequency up/down converter, modulator/demodulator, frequency equalization, negative-slope compensation, repeater, re-clocking, amplification, power levels, and so on. Note that the doppler compensation technique can be hardware-based/physical doppler-shift compensation that dynamically corrects doppler as the satellite moves across the horizon; this needs no modification to the UE. Frequency conversion can include mobile network operator (MNO)-to-Satcom frequency (band) conversion and Satcom-to-MNO frequency (band) conversion.

The RIS provides the LOS connectivity to the satellites, and also facilitates portability and disaggregation. The indoor RF signal is converted using the transcoding technology described herein, and then uses the RIS to achieve line-of-sight connectivity directly to the satellite. The RIS technology provides the capability to transmit the RF signal outdoor to the indoor environment and transmit UE signal from indoor to outdoor wirelessly, eliminating the needs of a physical cable connecting outdoor antenna and indoor UEs, which adds the benefit of portability.

One or more embodiments and concepts described herein can be embodied in a system, such as described and represented in the drawing figures and as represented in the example operations of FIG. 13, and for example can include at least one memory that stores computer executable components and/or operations, and at least one processor that executes computer executable components and/or operations stored in the memory. Example operations can include operation 1302, which represents obtaining first information corresponding to a first communication link between a user equipment and a first metasurface associated with a first node of a mesh network. Example operation 1304 represents obtaining second information corresponding to a second communication link between a satellite and a second metasurface associated with a second node of the mesh network. Example operation 1306 represents based on the first information and the second information, subdividing the first metasurface into a first portion for communication between the first node and the user equipment via the first portion, subdividing the first metasurface into a second portion for communication between the first node and the second node via the second portion, subdividing the second metasurface into a third portion for communication between the second node and the satellite, and subdividing the second metasurface into a fourth portion for communication between the second node and the first node.

The first information can correspond to the communication between the user equipment and the first node via the first portion, and can include at least one of: second signal strength data representative of a signal strength corresponding to the communication, frequency band data representative of a frequency band corresponding to the communication, or beamforming and directionality data representative of at least one of a beamforming characteristic or a directionality corresponding to the communication.

The second information can correspond to the communication between the satellite and the second node via the third portion, and can include at least one of: second signal strength data representative of a signal strength corresponding to the communication, frequency band data representative of a frequency band corresponding to the communication, or beamforming and directionality data representative of at least one of a beamforming characteristic or a directionality corresponding to the communication.

Further operations can include detecting a change to the first information from a first information state to a second information state, and based on the change to the second information state, redividing the first metasurface to change first dimensions of the first portion relative to second dimensions of the second portion.

Obtaining the first information and the subdividing of the first metasurface into the first portion and the second portion are performed using a first trained model of the first node, and the obtaining of the second information and the subdividing of the second metasurface into the third portion and the fourth portion are performed using a second trained model of the second node.

Further operations can include deploying the first node as a first edge compute device.

Training the first trained model can include using supervised learning to frequency band prediction.

Training the first trained model can include using reinforcement learning for control of adaptive beamforming and directionality.

Training the first trained model can include using graph neural networks for management of the mesh network.

Further operations can include detecting addition of a third node to the mesh network; the third node can include a third trained model, and in response to the detecting of the addition of the third node, obtaining third information associated with the third node, the third information comprising at least one of: third signal strength data representative of a signal strength corresponding to communication with the third node, third frequency band data representative of a frequency band corresponding to the communication with the third node, third beamforming and directionality data representative of at least one of a beamforming characteristic or a directionality corresponding to the communication with the third node, or network topology data representative of a network topology comprising the third node, and training the first trained model, the second trained model, and the third trained model based on the first information, the second information, and the third information, respectively.

Further operations can include updating the first trained model, the second trained model, and the third trained model based on aggregating, via federated learning, first data associated with the first trained model, second data associated with the second trained model, and third data associated with the third trained model.

Further operations can include collecting performance data of the mesh network, and retraining the first trained model, the second trained model, and the third trained model based on the performance data.

Figure 14:
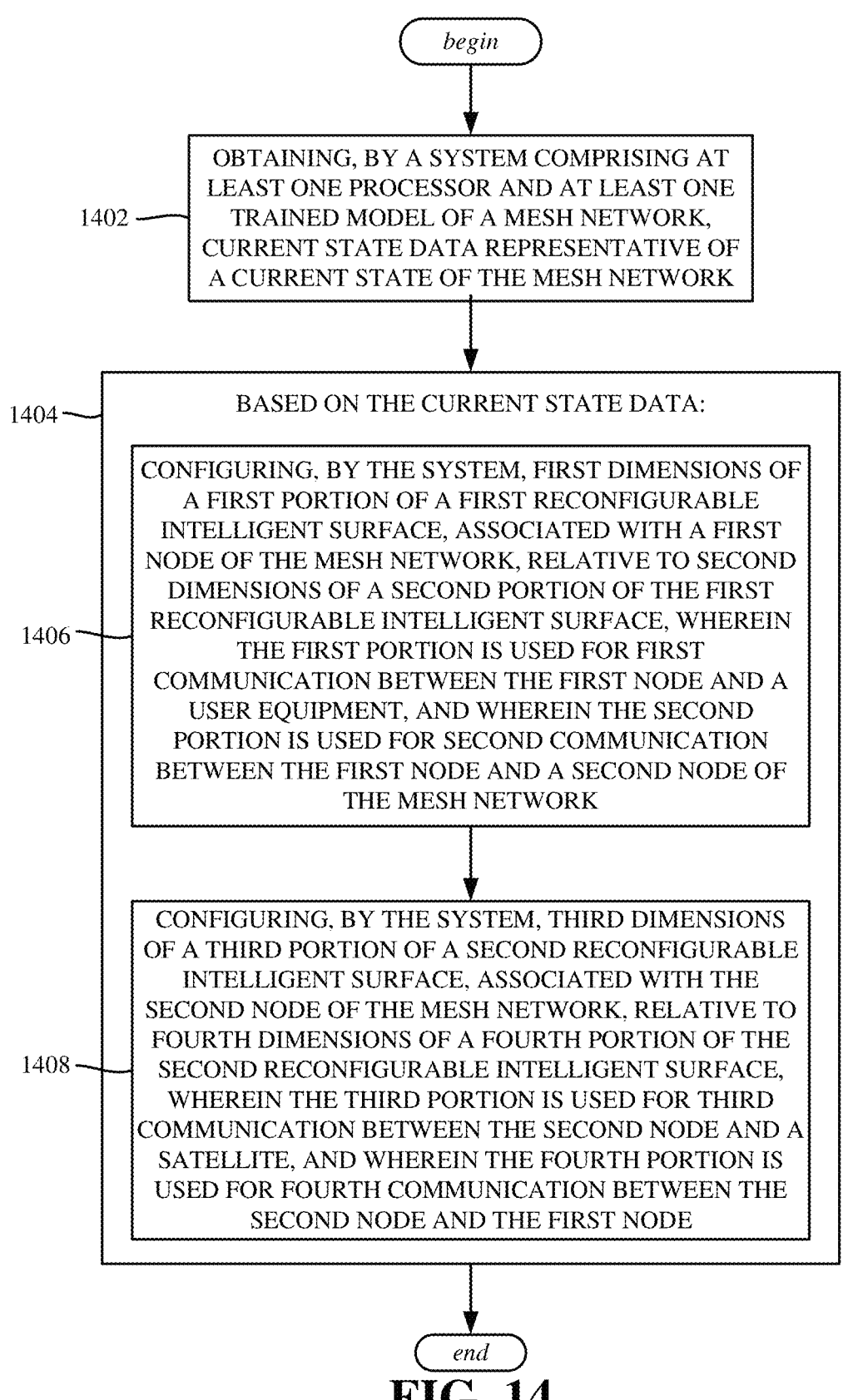
FIG. 14 is a flow diagram showing example operations related to configuring portions of metasurfaces based on current state data representative of a current state of a mesh network, in accordance with various example embodiments and implementations of the subject disclosure.

One or more example implementations and embodiments, such as corresponding to example operations of a method, or computer executable instructions/components can be represented in FIG. 14. Example operation 1402 represents obtaining, by a system comprising at least one processor and at least one trained model of a mesh network, current state data representative of a current state of the mesh network. Example operation 1404 represents, based on the current state data, performing example operations 1406 and 1408. Example operation 1406 represents configuring, by the system, first dimensions of a first portion of a first reconfigurable intelligent surface, associated with a first node of the mesh network, relative to second dimensions of a second portion of the first reconfigurable intelligent surface, the first portion can be used for first communication between the first node and a user equipment, and the second portion can be used for second communication between the first node and a second node of the mesh network. Example operation 1408 represents configuring, by the system, third dimensions of a third portion of a second reconfigurable intelligent surface, associated with the second node of the mesh network, relative to fourth dimensions of a fourth portion of the second reconfigurable intelligent surface, the third portion can be used for third communication between the second node and a satellite, and the fourth portion can be used for fourth communication between the second node and the first node.

Further operations can include detecting, by the system, a change to the current state data corresponding to network conditions, and, in response to the detecting of the change, reconfiguring, by the system, the third dimensions of the third portion of the second reconfigurable intelligent surface, relative to the fourth dimensions of the fourth portion of the second reconfigurable intelligent surface.

Further operations can include collecting, by the system, network performance data associated with the mesh network, and retraining the at least one trained model of the mesh network based on the network performance data.

Further operations can include detecting, by the system, a change to the current state data corresponding to addition of a third node to the mesh network, and in response to the detecting of the change, retraining the at least one trained model of the mesh network.

At least one trained model can include a first trained model associated with the first node, a second trained model associated with the second node, and further operations can include updating the first trained model and the second trained model via federated learning based on aggregating first data associated with the first trained model, and second data associated with the second trained model.

One or more embodiments can be embodied in a system, such as described and represented in the drawing figures herein. The system can include a mesh network comprising a first node, a second node and a third node, at least one trained model, and a first metasurface associated with the first node, a second metasurface associated with the second node, and a third metasurface associated with the third node. The at least one trained model can configure the first metasurface, comprising configuring a first portion of the first metasurface for first communication between the first node and a satellite, and configuring a second portion of the first metasurface for second communication between the first node and at least one other node of mesh network other than the first node, the second node and the third node. The at least one trained model can configure the second metasurface, which can include configuring a third portion of the second metasurface for third communication between the second node and a user equipment, and configuring a fourth portion of the second metasurface for fourth communication between the second node and the at least one other node of mesh network. The at least one trained model can configure the third metasurface for fifth communication between the third node and the at least one other node of mesh network.

The at least one trained model can configure the first portion of the first metasurface for a first part of the first communication between the first node and the satellite at a first time based on first current network conditions associated with the mesh network, and the at least one trained model can reconfigure the first portion of the first metasurface for a second part of the first communication between the first node and the satellite at a second time based on second current network conditions associated with the mesh network.

The first node can include a primary node that controls the configuring of the first metasurface, the configuring of the second metasurface, and the configuring of the third metasurface.

As can be seen, the technology described herein can be based on a mesh network including L1-PHY transcoder technology and metasurface (RIS) technology, in which the transcoder converts between the Satcom-air-interface and the 3GPP-5G-NR-air-interface, including decoding and reencoding data packets at the L1-PHY packet level, or operates in a bypass mode for D2D communications. A controller, e.g., a control and switching AI engine, controls uplink and downlink multiplexer states to select between the transcoder conversion mode or the bypass mode. This device can be implemented in an L1-PHY appliance that allows a 3GPP-compliant 5G NR model to connect directly to legacy and future LEO satellite constellations.

The technology described herein offers substantial benefits in terms of network performance, privacy, and adaptability. By leveraging advanced AI models for dynamic beamforming, direction control, and optimal frequency band selection, the system ensures high-quality connections and efficient resource utilization. The integration of federated learning maintains data privacy by keeping the data on-device and only sharing model updates, which enhances user trust and compliance with data privacy regulations. Additionally, the system's ability to dynamically slice the metasurface for different tasks, including allocating smaller slices for mesh node connectivity and larger slices for robust NTN connections, ensures efficient signal amplification and robust network performance.

The technology is supported by the availability of advanced AI frameworks and edge computing capabilities, including available tools that enable efficient on-device processing, making the system scalable and flexible. Federated learning frameworks facilitate privacy-preserving model training. Modern edge devices provide the computational power necessary for local processing, reducing the need for extensive central server infrastructure and lowering operational costs. This modular and scalable solution addresses the growing market demand for high-performance, privacy-preserving network management, making it a practical and economically viable option for deployment in dynamic environments such as smart homes and offices.

Moreover, the system is designed to be scalable and flexible, accommodating a growing network of edge nodes. The modular design allows for easy integration of additional devices, while the robust remote management capabilities, utilizing existing platforms, enable real-time performance monitoring, software updates, and configuration changes. This ensures that the system remains adaptable to evolving network demands and maintains optimal performance over time. Dynamic resource management and thermal overhead control further support sustainable and cost-effective operation, making this solution viable for widespread deployment in various real-time data processing applications.

The technology described herein thus allows user equipment that communicates using the 3GPP 5G NR mobile wireless language to communicate with satellites of a satellite constellation, both legacy constellations and newer constellations recently deployed, by passing the signals through the L1-PHY transcoder box. For non-LoS scenarios, e.g., indoor-located user equipment, communication with non-terrestrial network satellites is facilitated by using metasurface (reconfigurable intelligent surface) technology.

The technology described herein enhances signal reliability and quality by facilitating seamless communication between 5G NR and satellite networks. By enabling standard 5G-enabled devices to access satellite communication services, the transcoder box addresses the digital divide, providing broadband access to rural and underserved communities, for example. The dual RF front-end integration, packet-level transcoding, and NTN constellation agnostic connectivity collectively ensure robust and high-quality communication links.

As one example use case, such switching between the two air interfaces can be extremely beneficial in a disaster-relief emergency deployment where cellular (terrestrial) and NTN (satellite) communication can be spotty. Another use case is providing a universal communication device to the rural/underserved communities. Thus, the technology described herein transcodes the Satcom industry standard air-interface to the terrestrial mobile wireless standard, and vice-versa, while also enabling D2D communications between a UE and a satellite. In addition to packet-level conversion when needed, example protocols and resources that can convert, through the transcoding process, include, but are not limited to, doppler shifting/correction/compensation, frequency up/down conversion, modulator/demodulator, frequency equalization, negative-slope compensation, repeater, re-clocking, amplification, power levels, and the like.

The scalable and cost-effective design makes the solution economically viable, allowing for incremental upgrades and expansions, reducing initial deployment costs, while ensuring long-term adaptability to evolving network demands. By maintaining high signal quality and reducing latency, the solution enhances user experience.

The technology described herein enables UEs to connect to virtually any NTN constellation, rather than being limited to a single satellite provider's constellation. By supporting multiple satellite providers, the transcoder ensures continuous connectivity and improves coverage.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining first information corresponding to a first communication link between a user equipment and a first metasurface associated with a first node of a mesh network;

obtaining second information corresponding to a second communication link between a satellite and a second metasurface associated with a second node of the mesh network; and based on the first information and the second information, subdividing the first metasurface into a first portion for communication between the first node and the user equipment via the first portion, subdividing the first metasurface into a second portion for communication between the first node and the second node via the second portion, subdividing the second metasurface into a third portion for communication between the second node and the satellite, and subdividing the second metasurface into a fourth portion for communication between the second node and the first node.

2. The system of claim 1, wherein the first information corresponds to the communication between the user equipment and the first node via the first portion, and comprises at least one of: second signal strength data representative of a signal strength corresponding to the communication, frequency band data representative of a frequency band corresponding to the communication, or beamforming and directionality data representative of at least one of a beamforming characteristic or a directionality corresponding to the communication.

3. The system of claim 1, wherein the second information corresponds to the communication between the satellite and the second node via the third portion, and comprises at least one of: second signal strength data representative of a signal strength corresponding to the communication, frequency band data representative of a frequency band corresponding to the communication, or beamforming and directionality data representative of at least one of a beamforming characteristic or a directionality corresponding to the communication.

4. The system of claim 1, wherein the operations further comprise detecting a change to the first information from a first information state to a second information state, and, based on the change to the second information state, redividing the first metasurface to change first dimensions of the first portion relative to second dimensions of the second portion.

5. The system of claim 1, wherein the obtaining of the first information and the subdividing of the first metasurface into the first portion and the second portion are performed using a first trained model of the first node, and wherein the obtaining of the second information and the subdividing of the second metasurface into the third portion and the fourth portion are performed using a second trained model of the second node.

6. The system of claim 5, wherein the operations further comprise deploying the first node as a first edge compute device.

7. The system of claim 5, wherein the training of the first trained model comprises using supervised learning to frequency band prediction.

8. The system of claim 5, wherein the training of the first trained model comprises using reinforcement learning for control of adaptive beamforming and directionality.

9. The system of claim 5, wherein the training of the first trained model comprises using graph neural networks for management of the mesh network.

10. The system of claim 1, wherein the operations further comprise:

detecting addition of a third node to the mesh network, wherein the third node comprises a third trained model; and in response to the detecting of the addition of the third node:

obtaining third information associated with the third node, the third information comprising at least one of: third signal strength data representative of a signal strength corresponding to communication with the third node, third frequency band data representative of a frequency band corresponding to the communication with the third node, third beamforming and directionality data representative of at least one of a beamforming characteristic or a directionality corresponding to the communication with the third node, or network topology data representative of a network topology comprising the third node, and training the first trained model, the second trained model, and the third trained model based on the first information, the second information, and the third information, respectively.

11. The system of claim 10, wherein the operations further comprise updating the first trained model, the second trained model, and the third trained model based on aggregating, via federated learning, first data associated with the first trained model, second data associated with the second trained model, and third data associated with the third trained model.

12. The system of claim 10, wherein the operations further comprise collecting performance data of the mesh network, and retraining the first trained model, the second trained model, and the third trained model based on the performance data.

13. A method comprising, obtaining, by a system comprising at least one processor and at least one trained model of a mesh network, current state data representative of a current state of the mesh network; and based on the current state data, configuring, by the system, first dimensions of a first portion of a first reconfigurable intelligent surface, associated with a first node of the mesh network, relative to second dimensions of a second portion of the first reconfigurable intelligent surface, wherein the first portion is used for first communication between the first node and a user equipment, and wherein the second portion is used for second communication between the first node and a second node of the mesh network;

configuring, by the system, third dimensions of a third portion of a second reconfigurable intelligent surface, associated with the second node of the mesh network, relative to fourth dimensions of a fourth portion of the second reconfigurable intelligent surface, wherein the third portion is used for third communication between the second node and a satellite, and wherein the fourth portion is used for fourth communication between the second node and the first node.

14. The method of claim 13, further comprising detecting, by the system, a change to the current state data corresponding to network conditions, and, in response to the detecting of the change, reconfiguring, by the system, the third dimensions of the third portion of the second reconfigurable intelligent surface, relative to the fourth dimensions of the fourth portion of the second reconfigurable intelligent surface.

15. The method of claim 13, further comprising collecting, by the system, network performance data associated with the mesh network, and retraining the at least one trained model of the mesh network based on the network performance data.

16. The method of claim 13, further comprising:

detecting, by the system, a change to the current state data corresponding to addition of a third node to the mesh network; and in response to the detecting of the change, retraining the at least one trained model of the mesh network.

17. The method of claim 13, wherein the at least one trained model comprises a first trained model associated with the first node, a second trained model associated with the second node, and further comprising:

updating the first trained model and the second trained model via federated learning based on aggregating first data associated with the first trained model, and second data associated with the second trained model.

18. A system, comprising:

a mesh network comprising a first node, a second node and a third node;

at least one trained model; and a first metasurface associated with the first node, a second metasurface associated with the second node, and a third metasurface associated with the third node, wherein the at least one trained model:

configures the first metasurface, comprising configuring a first portion of the first metasurface for first communication between the first node and a satellite, and configuring a second portion of the first metasurface for second communication between the first node and at least one other node of mesh network other than the first node, the second node and the third node;

configures the second metasurface, comprising configuring a third portion of the second metasurface for third communication between the second node and a user equipment, and configuring a fourth portion of the second metasurface for fourth communication between the second node and the at least one other node of mesh network; and configures the third metasurface for fifth communication between the third node and the at least one other node of mesh network.

19. The system of claim 18, wherein the at least one trained model configures the first portion of the first metasurface for a first part of the first communication between the first node and the satellite at a first time based on first current network conditions associated with the mesh network, and wherein the at least one trained model reconfigures the first portion of the first metasurface for a second part of the first communication between the first node and the satellite at a second time based on second current network conditions associated with the mesh network.

20. The system of claim 18, wherein the first node comprises a primary node that controls the configuring of the first metasurface, the configuring of the second metasurface, and the configuring of the third metasurface.

\* \* \* \* \*